United States Patent
Yamamoto

(10) Patent No.: US 12,489,975 B2
(45) Date of Patent: Dec. 2, 2025

(54) INFORMATION PROCESSING DEVICE, AND OPERATION METHOD AND OPERATION PROGRAM THEREOF

(71) Applicant: FUJIFILM Corporation, Tokyo (JP)

(72) Inventor: Hiroaki Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 208 days.

(21) Appl. No.: 18/069,279

(22) Filed: Dec. 21, 2022

(65) Prior Publication Data

US 2023/0121799 A1    Apr. 20, 2023

Related U.S. Application Data

(63) Continuation of application No. PCT/JP2021/019891, filed on May 26, 2021.

(30) Foreign Application Priority Data

Jun. 25, 2020  (JP) .................. 2020-109803

(51) Int. Cl.
 *H04N 23/67* (2023.01)
 *G06V 10/74* (2022.01)
(52) U.S. Cl.
 CPC ......... *H04N 23/675* (2023.01); *G06V 10/761* (2022.01)
(58) Field of Classification Search
 CPC .... H04N 23/675; H04N 23/60; G06V 10/761; G06V 10/993; G06V 20/693; G02B 7/36
 See application file for complete search history.

(56) References Cited

U.S. PATENT DOCUMENTS

| | | |
|---|---|---|
| 2013/0301909 A1 | 11/2013 | Sato |
| 2014/0376816 A1 | 12/2014 | Lagae et al. |
| 2017/0061619 A1 | 3/2017 | Lagae et al. |
| 2017/0363853 A1* | 12/2017 | Besley ................ G06V 20/693 |

(Continued)

FOREIGN PATENT DOCUMENTS

| | | | |
|---|---|---|---|
| CN | 101349540 | * | 7/2007 |
| CN | 101349540 B | | 6/2011 |
| JP | 2006-058321 A | | 3/2006 |

(Continued)

OTHER PUBLICATIONS

International Search Report dated Aug. 17, 2021, issued in International Application No. PCT/JP2021/019891.

(Continued)

*Primary Examiner* — Christopher K Peterson
(74) *Attorney, Agent, or Firm* — Sughrue Mion, PLLC

(57) ABSTRACT

An information processing device that reconstructs an original image including an interference fringe image of an object to be observed includes at least one processor. The processor acquires the original image, generates a reconstructed image while changing a reconstruction position from an initial position based on the original image, calculates sharpness of the reconstructed image each time the reconstructed image is generated and detects an in-focus position where the calculated sharpness is maximized, records the in-focus position, decides the initial position in a next reconstruction processing based on the in-focus position, and repeats the original image acquisition every one imaging cycle.

10 Claims, 16 Drawing Sheets

(56) References Cited

U.S. PATENT DOCUMENTS

2019/0049897 A1   2/2019   Tatsuta et al.

FOREIGN PATENT DOCUMENTS

| | | |
|---|---|---|
| JP | 2008-249804 A | 10/2008 |
| JP | 2017-075958 A | 4/2017 |
| JP | 2017-146696 A | 8/2017 |
| JP | 2017-168602 A | 9/2017 |
| WO | 2012/099220 A1 | 7/2012 |
| WO | 2016/163560 A1 | 10/2016 |
| WO | 2018/158810 A1 | 9/2018 |
| WO | 2019/180810 A1 | 9/2019 |

OTHER PUBLICATIONS

Written Opinion dated Aug. 17, 2021, issued in International Application No. PCT/JP2021/019891.
International Preliminary Report on Patentability dated Dec. 13, 2022, issued in International Application No. PCT/JP2021/019891.
Inkyu Moon, et al., "Automated Three-Dimensional Identification and Tracking of Micro/Nanobiological Organisms by Computational Holographic Microscopy", Proceedings of the IEEE, Jun. 2009, vol. 97, No. 6, pp. 990-1010 (21 pages total).
Extended European Search Report issued Oct. 20, 2023 in European Application No. 21828784.5.

* cited by examiner

INFORMATION PROCESSING DEVICE, AND OPERATION METHOD AND OPERATION PROGRAM THEREOF

CROSS-REFERENCE TO RELATED APPLICATIONS

This application is a continuation application of International Application No. PCT/JP2021/019891 filed May 26, 2021 the disclosure of which is incorporated herein by reference in its entirety. Further, this application claims priorities from Japanese Patent Application No. 2020-109803, filed Jun. 25, 2020, the disclosure of which is incorporated herein by reference in their entirety.

TECHNICAL FIELD

The technique of the present disclosure relates to an information processing device, and an operation method and operation program thereof.

RELATED ART

In order to reduce a size of a device that images a small object to be observed, such as a cell, so-called lens-free digital holography in which an optical-system component is eliminated is known. In the digital holography, the object to be observed is imaged by using a light source that emits coherent light such as a laser beam and an image including an interference fringe image obtained by the imaging is reconstructed to generate a reconstructed image at a predetermined reconstruction position. In the reconstruction processing, the reconstruction position, which is a position corresponding to a distance from an imaging sensor in a light source direction, is used as a parameter. Hereinafter, the image including the interference fringe image before the reconstruction is performed is referred to as an original image.

In a case where the reconstruction position is not appropriate for the object to be observed, the obtained reconstructed image becomes unclear. Thus, in the reconstruction processing, it has been proposed to search for an in-focus position in which a clear reconstructed image can be obtained by using the reconstruction position as a parameter (refer to, for example, JP2017-168602A). The reconstruction position is a position corresponding to a focal length described in JP2017-168602A.

In digital holography, it is known that imaging is performed on a cell or the like flowing through a microchannel (also referred to as a microfluidic channel), which is a minute flow channel, as an observation target (refer to, for example, JP2017-075958A). JP2017-075958A discloses that an original image is processed in real time while capturing a moving image of an object to be observed flowing through the microchannel by an imaging sensor to sort cells and the like. [0006] In a case where the moving image of the object to be observed flowing through the microchannel is captured as described in JP2017-075958A, a position related to a depth direction (direction orthogonal to an imaging surface of the imaging sensor) of the object to be observed in the microchannel is not constant, but a variation occurs. Therefore, in order to obtain a clear reconstructed image, it is necessary to search for the in-focus position based on the original image obtained every one imaging cycle. In a case where the original image is processed in real time, it is necessary to finish the search for the in-focus position within at least one imaging cycle. Therefore, it is required to speed up the search for the in-focus position.

SUMMARY

An object of the technique of the present disclosure is to provide an information processing device, and an operation method and operation program thereof capable of speeding up a search for an in-focus position.

In order to achieve the above object, an information processing device of the present disclosure is an information processing device that reconstructs an original image including an interference fringe image of an object to be observed and comprises at least one processor. The processor executes original image acquisition processing of acquiring the original image, reconstruction processing of generating a reconstructed image while changing a reconstruction position from an initial position based on the original image acquired by the original image acquisition processing, in-focus position detection processing of calculating sharpness of the reconstructed image each time the reconstructed image is generated by the reconstruction processing and detecting an in-focus position where the calculated sharpness is maximized, in-focus position recording processing of recording the in-focus position detected by the in-focus position detection processing, initial position deciding processing of deciding the initial position in a next reconstruction processing based on the in-focus position recorded by the in-focus position recording processing, and repetition processing of executing the original image acquisition processing, the reconstruction processing, the in-focus position detection processing, the in-focus position recording processing, and the initial position deciding processing every one imaging cycle.

In the initial position deciding processing, it is preferable that the processor decide the in-focus position obtained in an immediately preceding imaging cycle as the initial position among one or more in-focus positions recorded in the past in the in-focus position recording processing.

In the initial position deciding processing, it is preferable that the processor decides the initial position based on a statistical amount of one or more in-focus positions recorded in the past in the in-focus position recording processing.

It is preferable that the statistical amount is a most frequent value, a median value, or an average value.

In the reconstruction processing, it is preferable that the processor changes the reconstruction position from the initial position in a direction in which the sharpness increases.

It is preferable that the processor further executes difference processing of calculating a difference amount between two original images or two reconstructed images having different imaging cycles and stop processing of stopping the repetition processing in a case where the difference amount calculated by the difference processing is equal to or less than a certain value.

It is preferable that the processor further executes notification information output processing of outputting notification information in a case where the difference amount calculated by the difference processing is equal to or less than a certain value.

It is preferable that the processor executes optimal reconstructed image output processing of outputting the reconstructed image at the in-focus position detected by the in-focus position detection processing as an optimal reconstructed image in the repetition processing.

A method of operating an information processing device according to the present disclosure is a method of operating an information processing device that reconstructs an original image including an interference fringe image of an object to be observed. The method executes original image acquisition processing of acquiring the original image, reconstruction processing of generating a reconstructed image while changing a reconstruction position from an initial position based on the original image acquired by the original image acquisition processing, in-focus position detection processing of calculating sharpness of the reconstructed image each time the reconstructed image is generated by the reconstruction processing and detecting an in-focus position where the calculated sharpness is maximized, in-focus position recording processing of recording the in-focus position detected by the in-focus position detection processing, initial position deciding processing of deciding the initial position in a next reconstruction processing based on the in-focus position recorded by the in-focus position recording processing, and repetition processing of executing the original image acquisition processing, the reconstruction processing, the in-focus position detection processing, the in-focus position recording processing, and the initial position deciding processing every one imaging cycle.

An operation program of the present disclosure is an operation program causing a computer to execute processing of reconstructing an original image including an interference fringe image of an object to be observed. The operation program causes the computer to execute original image acquisition processing of acquiring the original image, reconstruction processing of generating a reconstructed image while changing a reconstruction position from an initial position based on the original image acquired by the original image acquisition processing, in-focus position detection processing of calculating sharpness of the reconstructed image each time the reconstructed image is generated by the reconstruction processing and detecting an in-focus position where the calculated sharpness is maximized, in-focus position recording processing of recording the in-focus position detected by the in-focus position detection processing, initial position deciding processing of deciding the initial position in a next reconstruction processing based on the in-focus position recorded by the in-focus position recording processing, and repetition processing of executing the original image acquisition processing, the reconstruction processing, the in-focus position detection processing, the in-focus position recording processing, and the initial position deciding processing every one imaging cycle.

According to the technique of the present disclosure, it is possible to provide the information processing device, and the operation method and operation program thereof capable of speeding up the search for the in-focus position.

DETAILED DESCRIPTION

An example of an embodiment according to the technique of the present disclosure will be described with reference to accompanying drawings.

First Embodiment

Figure 1:
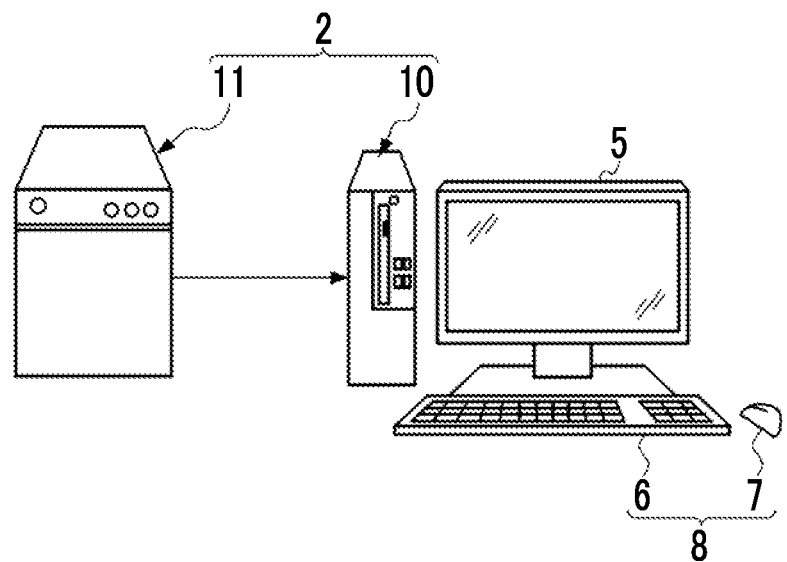
FIG. 1 is a diagram showing an example of a configuration of a digital holography system according to a first embodiment.

FIG. 1 shows a configuration of a digital holography system 2 according to a first embodiment. The digital holography system 2 is configured of an information processing device 10 and an imaging device 11. The imaging device 11 is connected to the information processing device 10.

The information processing device 10 is, for example, a desktop personal computer. A display 5, a keyboard 6, a mouse 7, and the like are connected to the information processing device 10. The keyboard 6 and the mouse 7 constitute an input device 8 for a user to input information. The input device 8 also includes a touch panel and the like.

Figure 2:
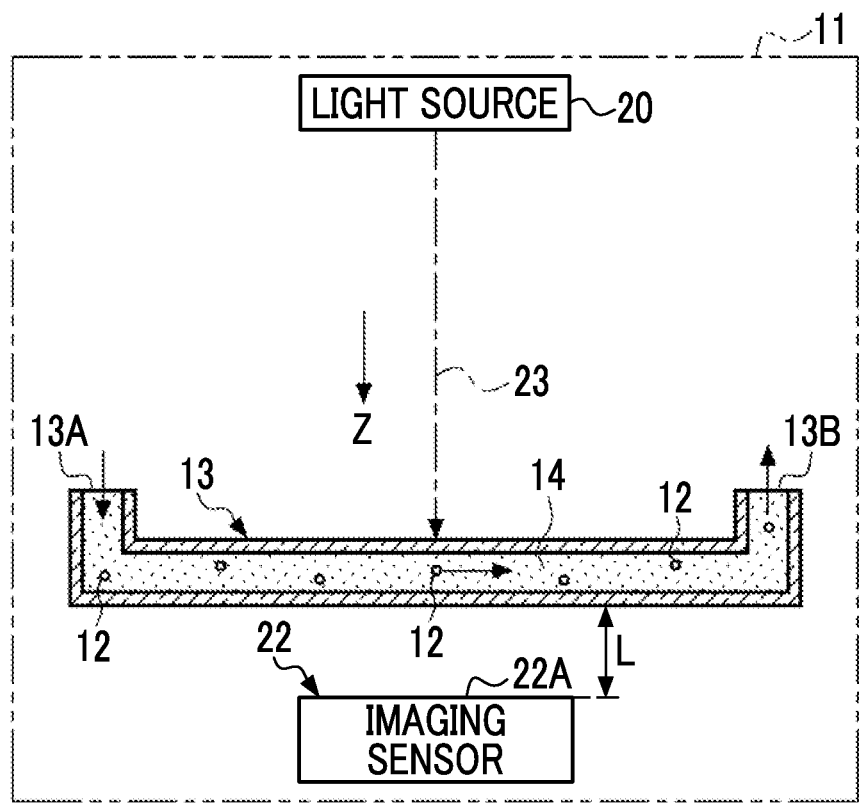
FIG. 2 is a diagram showing an example of a configuration of an imaging device.

FIG. 2 shows an example of a configuration of the imaging device 11. The imaging device 11 includes a light source 20 and an imaging sensor 22. The light source 20 is, for example, a laser diode. The light source 20 may be configured by combining a light emitting diode and a pinhole.

A microchannel 13 is disposed between the light source 20 and the imaging sensor 22. The microchannel 13 is formed in, for example, a channel unit formed of a silicone resin and is a flow channel through which a liquid can flow. The channel unit is transparent to light and can irradiate the inside of the microchannel 13 with light from the outside of the channel unit. The microchannel 13 is provided with an opening portion 13A for introducing a solution 14 containing a cell 12 and the like and an opening portion 13B for discharging the solution 14 introduced into the microchannel 13.

The solution 14 is introduced into the opening portion 13A of the microchannel 13 from a tank (not shown), flows through the microchannel 13 at a constant speed, and is discharged from the opening portion 13B. The light source 20, the imaging sensor 22, and the microchannel 13 are disposed in, for example, an incubator (not shown). For example, the imaging device 11 performs imaging with the cell 12 contained in the solution 14 as an imaging target. The cell 12 is an example of an "object to be observed" according to the technique of the present disclosure.

The light source 20 irradiates irradiation light 23 toward the microchannel 13. The irradiation light 23 is coherent light. The irradiation light 23 is incident on the microchannel 13, transmits through the microchannel 13, and then is incident on an imaging surface 22A of the imaging sensor 22. A Z direction indicated by an arrow is an irradiation direction of the irradiation light 23. The microchannel 13 is disposed such that a flow direction of the solution 14 is substantially orthogonal to the Z direction.

A shape of the microchannel 13 and the number of opening portions 13A and 13B can be changed as appropriate. Further, the number of microchannels 13 disposed between the light source 20 and the imaging sensor 22 is not limited to one and may be two or more. In the present embodiment, one microchannel 13 is assumed to be disposed between the light source 20 and the imaging sensor 22.

The imaging sensor 22 is configured of, for example, a monochrome complementary metal oxide semiconductor (CMOS) type image sensor. An imaging operation of the imaging sensor 22 is controlled by the information processing device 10. The imaging sensor 22 is disposed such that the imaging surface 22A is orthogonal to the Z direction. It is preferable that a distance L between the imaging surface 22A and the channel unit in which the microchannel 13 is formed is as small as possible. Further, it is also preferable that the imaging surface 22A is in contact with the channel unit (that is, L=0).

The irradiation light 23 is incident on the solution 14 in the microchannel 13 and diffracted by the cell 12, and thus an interference fringe image reflecting a shape of the cell 12 is generated. The interference fringe image is also referred to as a hologram image.

Figure 3:
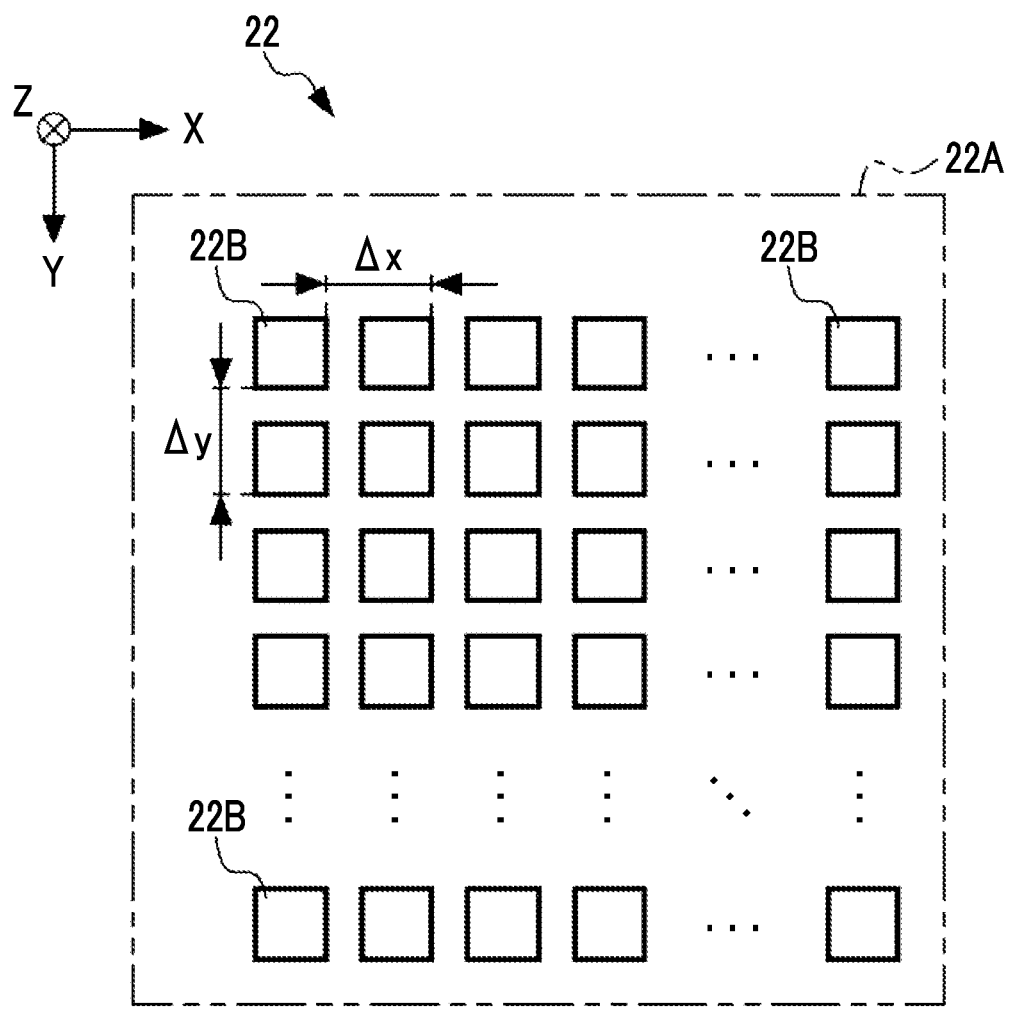
FIG. 3 is a diagram showing an example of a configuration of an imaging sensor.

FIG. 3 shows an example of a configuration of the imaging sensor 22. The imaging sensor 22 has a plurality of pixels 22B arranged on the imaging surface 22A. The pixel 22B is a photoelectric conversion element that performs photoelectric conversion of the incident light to output a pixel signal according to an amount of incident light.

The pixels 22B are arranged at equal pitches along an X direction and a Y direction. The arrangement of the pixels 22B is a so-called square arrangement. The X direction is a direction orthogonal to the Z direction. The Y direction is a direction orthogonal to the X direction and the Z direction. The pixels 22B are arranged in the X direction at a first arrangement pitch $\Delta x$ and in the Y direction at a second arrangement pitch $\Delta y$.

The imaging sensor 22 images the light incident on the imaging surface 22A and outputs image data configured of the pixel signal output from each of the pixels 22B. Hereinafter, the output of the image data is simply referred to as the output of the image.

Figure 4:
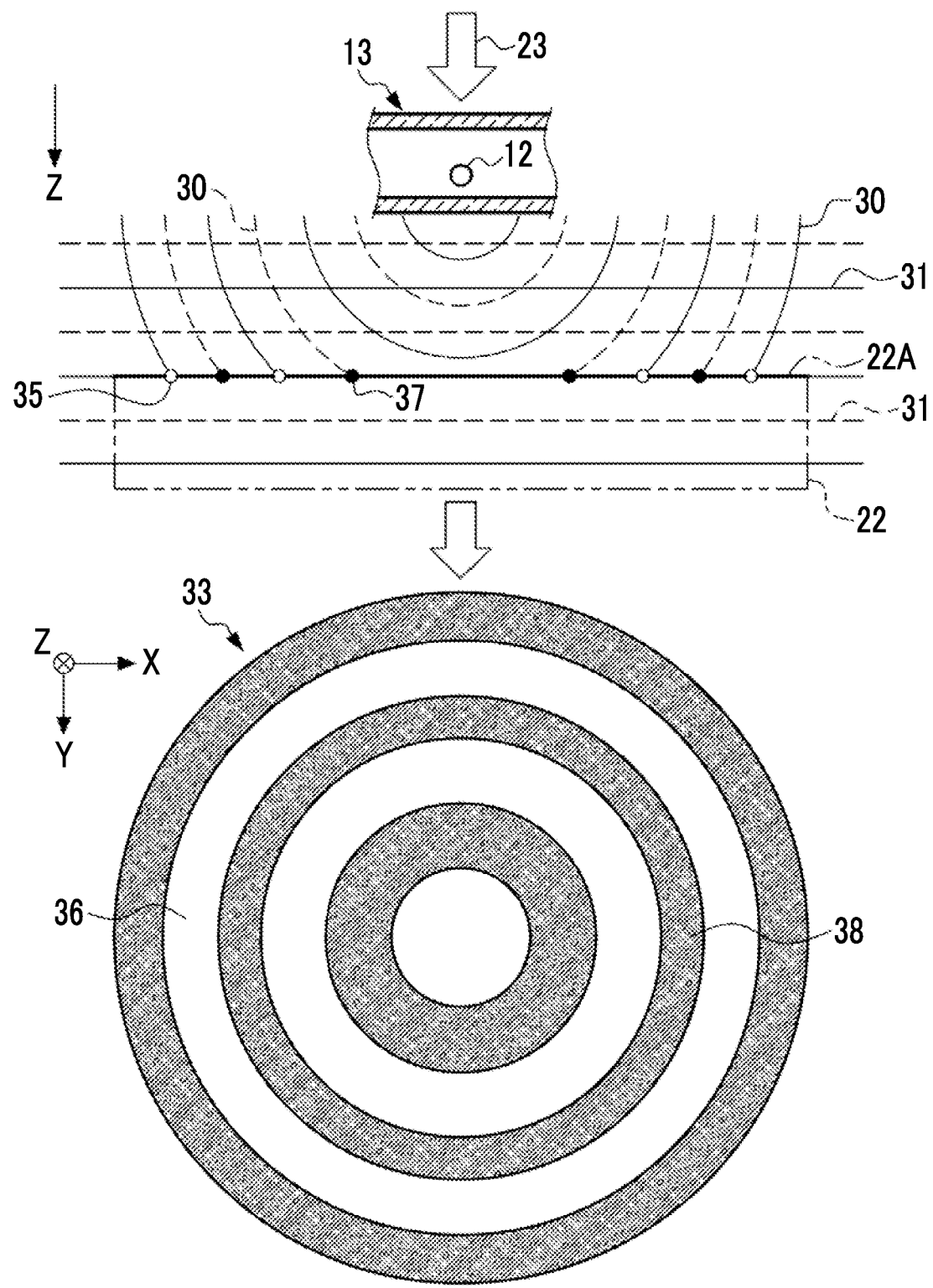
FIG. 4 is a diagram showing a state in which an interference fringe image is generated by a cell.

FIG. 4 shows a state in which an interference fringe image 33 is generated by the cell 12. A part of the irradiation light 23 incident on the microchannel 13 is diffracted by the cell 12. That is, the irradiation light 23 is divided into diffracted light 30 diffracted by the cell 12 and transmitted light 31 that is not diffracted by the cell 12 and transmits through the microchannel 13. The transmitted light 31 is a planar wave. The diffracted light 30 and the transmitted light 31 pass through the microchannel 13 and are incident on the imaging surface 22A of the imaging sensor 22.

The diffracted light 30 and the transmitted light 31 interfere with each other to generate the interference fringe image 33. The interference fringe image 33 is configured of a bright portion 36 and a dark portion 38. In FIG. 4, the bright portion 36 and the dark portion 38 are illustrated in the interference fringe image 33 as circular portions, respectively. However, the shape of the interference fringe image 33 changes according to the shape and internal structure of the cell 12. The imaging sensor 22 captures an optical image including the interference fringe image 33 formed on the imaging surface 22A and outputs an original image OP (refer to FIG. 7) including the interference fringe image 33.

Figure 5:
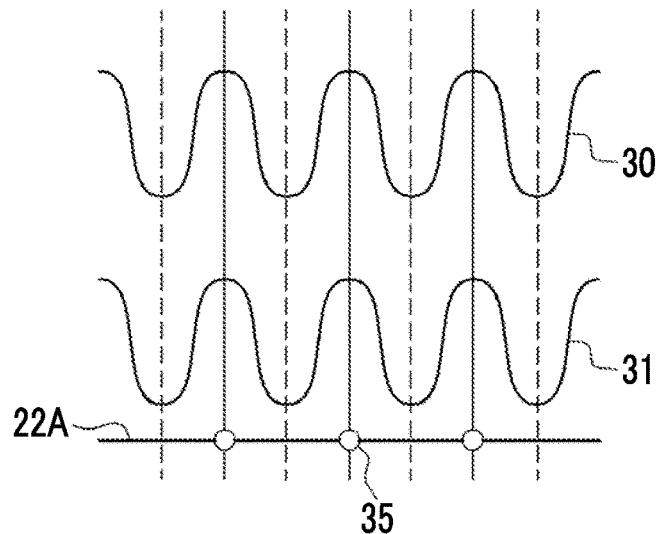
FIG. 5 is a diagram showing a wavefront in a case where diffracted light and transmitted light strengthen each other.
Figure 6:
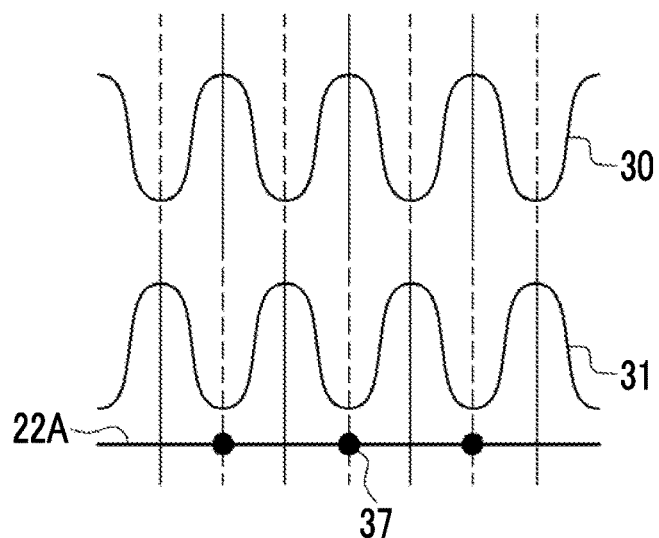
FIG. 6 is a diagram showing a wavefront in a case where diffracted light and transmitted light weaken each other.

FIGS. 5 and 6 show wavefronts of the diffracted light 30 and the transmitted light 31. FIG. 5 shows the wavefront in a case where the diffracted light 30 and the transmitted light 31 strengthen each other. FIG. 6 shows the wavefront in a case where the diffracted light 30 and the transmitted light 31 weaken each other. In FIGS. 5 and 6, solid lines indicate the wavefronts having a maximum amplitude of the diffracted light 30 and the transmitted light 31. On the contrary, broken lines indicate the wavefront having a minimum amplitude of the diffracted light 30 and the transmitted light 31.

In FIG. 5, a white spot 35 shown on the imaging surface 22A is a portion where the wavefronts of the diffracted light 30 and the transmitted light 31 are aligned and strengthen each other. The portion of the white spot 35 corresponds to the bright portion 36 (refer to FIG. 4) of the interference fringe image 33. In FIG. 6, a black spot 37 shown on the imaging surface 22A is a portion where the wavefronts of the diffracted light 30 and the transmitted light 31 are deviated by a half wavelength and weaken each other. The portion of the black spot 37 corresponds to the dark portion 38 (refer to FIG. 4) of the interference fringe image 33.

Figure 7:
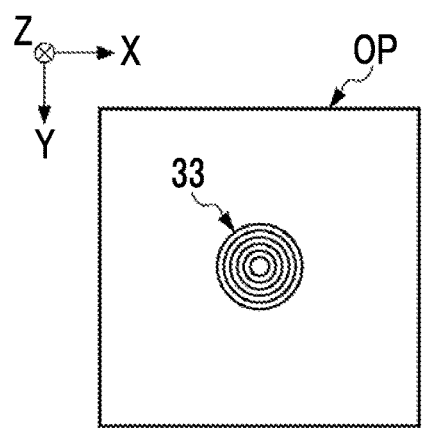
FIG. 7 is a diagram showing an example of an original image output from the imaging sensor.

FIG. 7 shows an example of the original image OP output from the imaging sensor 22. The original image OP shown in FIG. 7 includes one interference fringe image 33 generated by the diffraction of the irradiation light 23 by one cell 12 (refer to FIG. 4) included in an imaging region of the imaging sensor 22.

Figure 8:
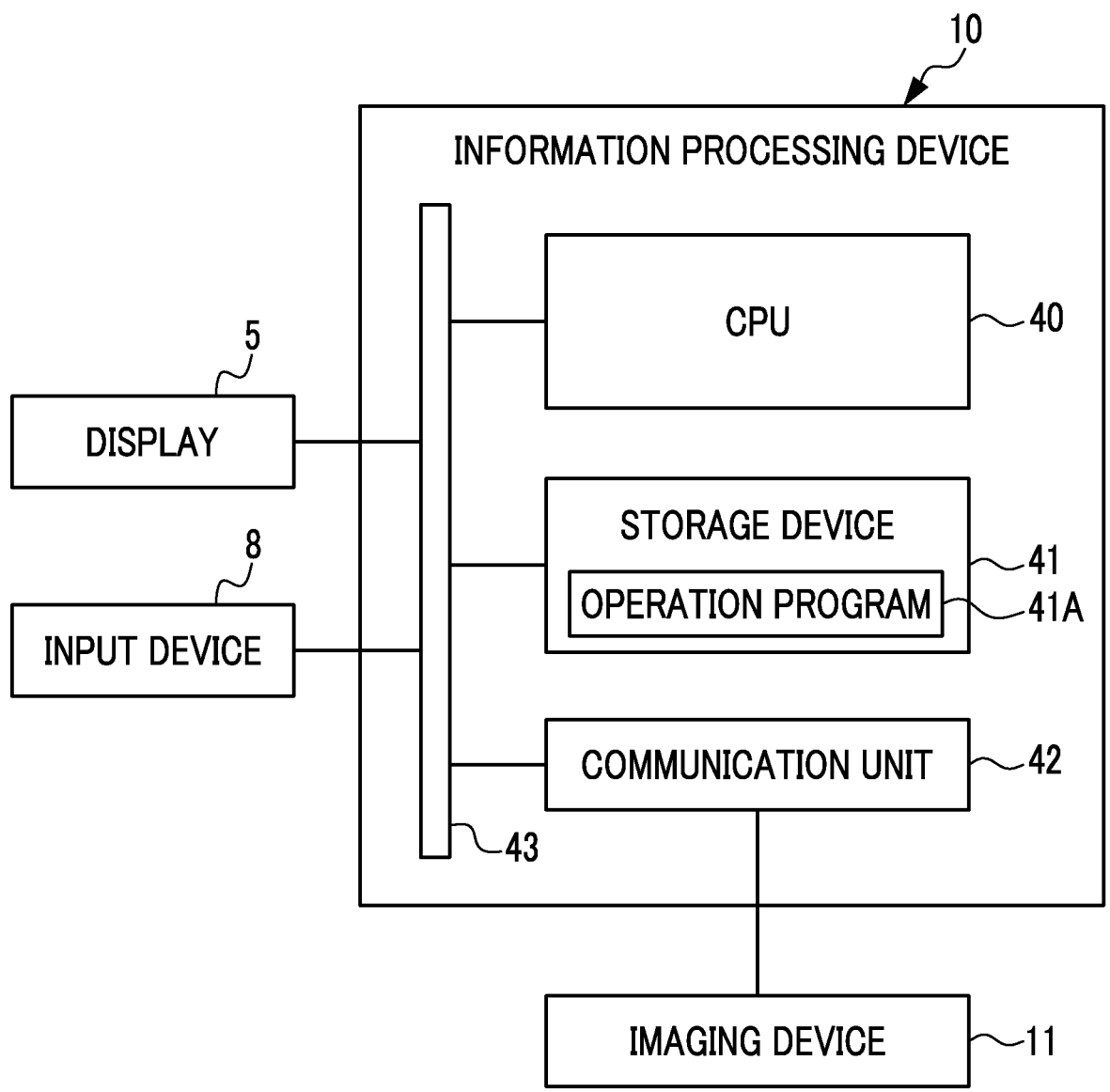
FIG. 8 is a block diagram showing an example of a hardware configuration of an information processing device.

FIG. 8 shows an example of a hardware configuration of the information processing device 10. As shown in FIG. 8, the information processing device 10 comprises a central processing unit (CPU) 40, a storage device 41, and a communication unit 42, which are interconnected via a bus line 43. Further, the display 5 and the input device 8 are connected to the bus line 43.

The CPU 40 is a calculation device that reads out an operation program 41A and various types of data (not shown) stored in the storage device 41 and executes processing to realize various functions. The CPU 40 is an example of a "processor" according to the technique of the present disclosure.

The storage device 41 includes, for example, a random access memory (RAM), a read only memory (ROM), or a storage device. The RAM is, for example, a volatile memory used as a work area or the like. The ROM is, for example, a non-volatile memory such as a flash memory that holds the operation program 41A and various types of data. The storage device is, for example, a hard disk drive (HDD) or a solid state drive (SSD). The storage stores an operating system (OS), an application program, image data, various types of data, and the like.

The communication unit 42 is a network interface that controls transmission of various types of information via a network such as a local area network (LAN) or a wide area network (WAN). The information processing device 10 is connected to the imaging device 11 via the communication unit 42. The display 5 displays various screens. The information processing device 10 receives an input of an operation instruction from the input device 8 through various screens.

Figure 9:
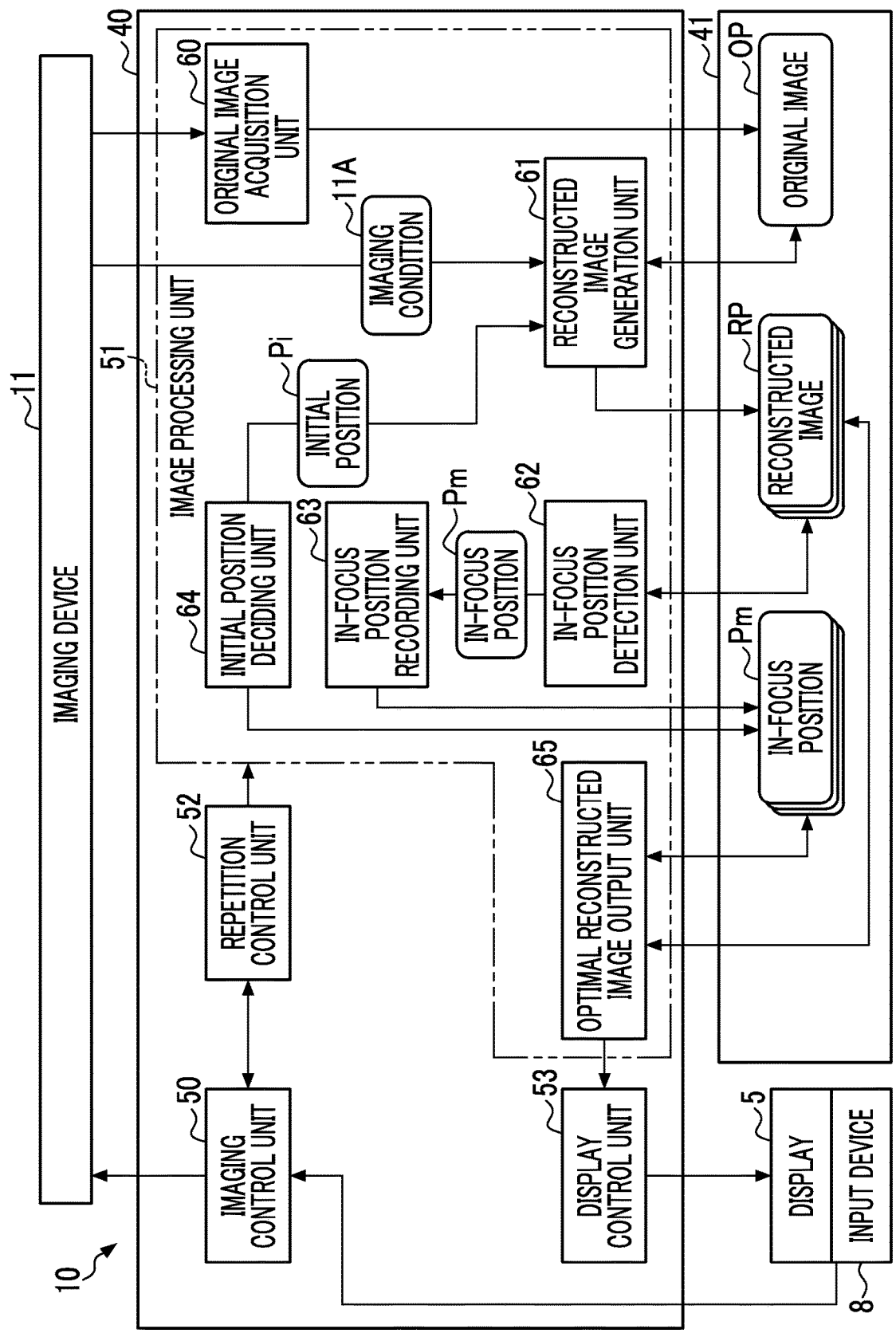
FIG. 9 is a block diagram showing an example of a functional configuration of the information processing device.

FIG. 9 shows an example of a functional configuration of the information processing device 10. A function of the information processing device 10 is realized by the CPU 40 executing processing based on the operation program 41A. As shown in FIG. 9, the CPU 40 is configured of an imaging control unit 50, an image processing unit 51, a repetition control unit 52, and a display control unit 53.

The imaging control unit 50 controls an operation of the imaging device 11. Specifically, the imaging control unit 50 controls an operation of generating the irradiation light 23 by the light source 20 and an imaging operation of the imaging sensor 22. Hereinafter, the operation of generating the irradiation light 23 by the light source 20 and the imaging operation of the imaging sensor 22 are collectively referred to as an imaging operation of the imaging device 11. The imaging control unit 50 causes the imaging device 11 to execute the imaging operation based on an operation signal input from the input device 8.

Figure 10:
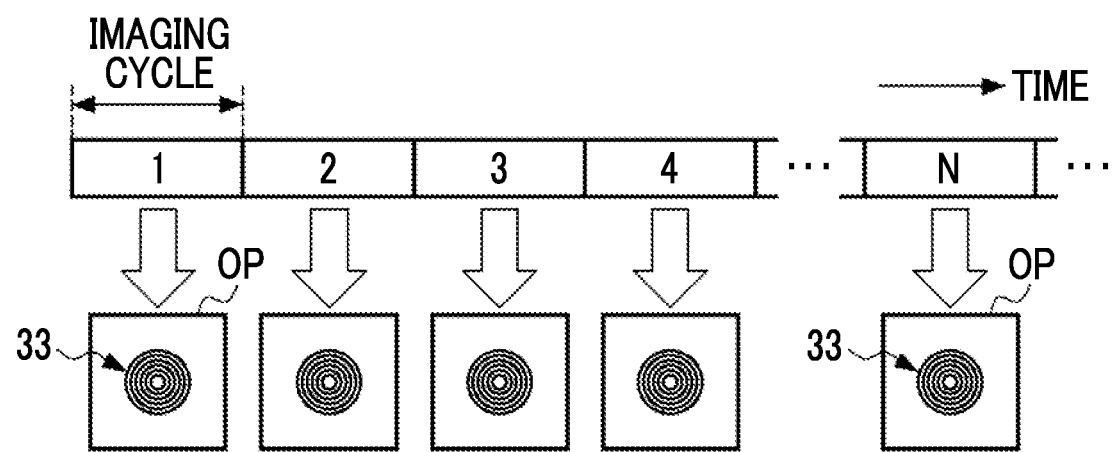
FIG. 10 is a diagram for describing an imaging operation of the imaging device.

The imaging control unit 50 drives the imaging device 11 to periodically perform the imaging every one imaging cycle. That is, the imaging device 11 captures the moving image. As shown in FIG. 10, the imaging device 11 performs the imaging operation every one imaging cycle and outputs the original image OP.

The image processing unit 51 performs reconstruction processing, in-focus position detection processing, and the like based on the original image OP (refer to FIG. 7) output from the imaging device 11, and outputs an optimal reconstructed image in which the cell 12, which is the object to be observed, is in focus.

The repetition control unit 52 causes the image processing unit 51 to repeatedly execute the reconstruction processing, the in-focus position detection processing, and the like in synchronization with the imaging cycle of the imaging device 11. The image processing unit 51 outputs the optimal reconstructed image every one imaging cycle.

The display control unit 53 displays the optimal reconstructed image output from the image processing unit 51 every one imaging cycle on the display 5. Accordingly, the optimal reconstructed image is displayed on the display 5 in real time.

The imaging control unit 50 causes the imaging device 11 to start the imaging operation in response to an input of an imaging start signal from the input device 8 and to stop the imaging operation of the imaging device 11 in response to an input of an imaging stop signal from the input device 8. The repetition control unit 52 causes the image processing unit 51 to start the operation in response to the start of the imaging operation by the imaging device 11 and to stop the operation of the image processing unit 51 in response to the stop of the imaging operation.

The image processing unit 51 has an original image acquisition unit 60, a reconstructed image generation unit 61, an in-focus position detection unit 62, an in-focus position recording unit 63, an initial position deciding unit 64, and an optimal reconstructed image output unit 65.

The original image acquisition unit 60 acquires the original image OP (refer to FIG. 10) output as a result of imaging of the microchannel 13 by the imaging device 11 every one imaging cycle. The original image acquisition unit 60 stores the acquired original image OP in the storage device 41.

Figure 11:
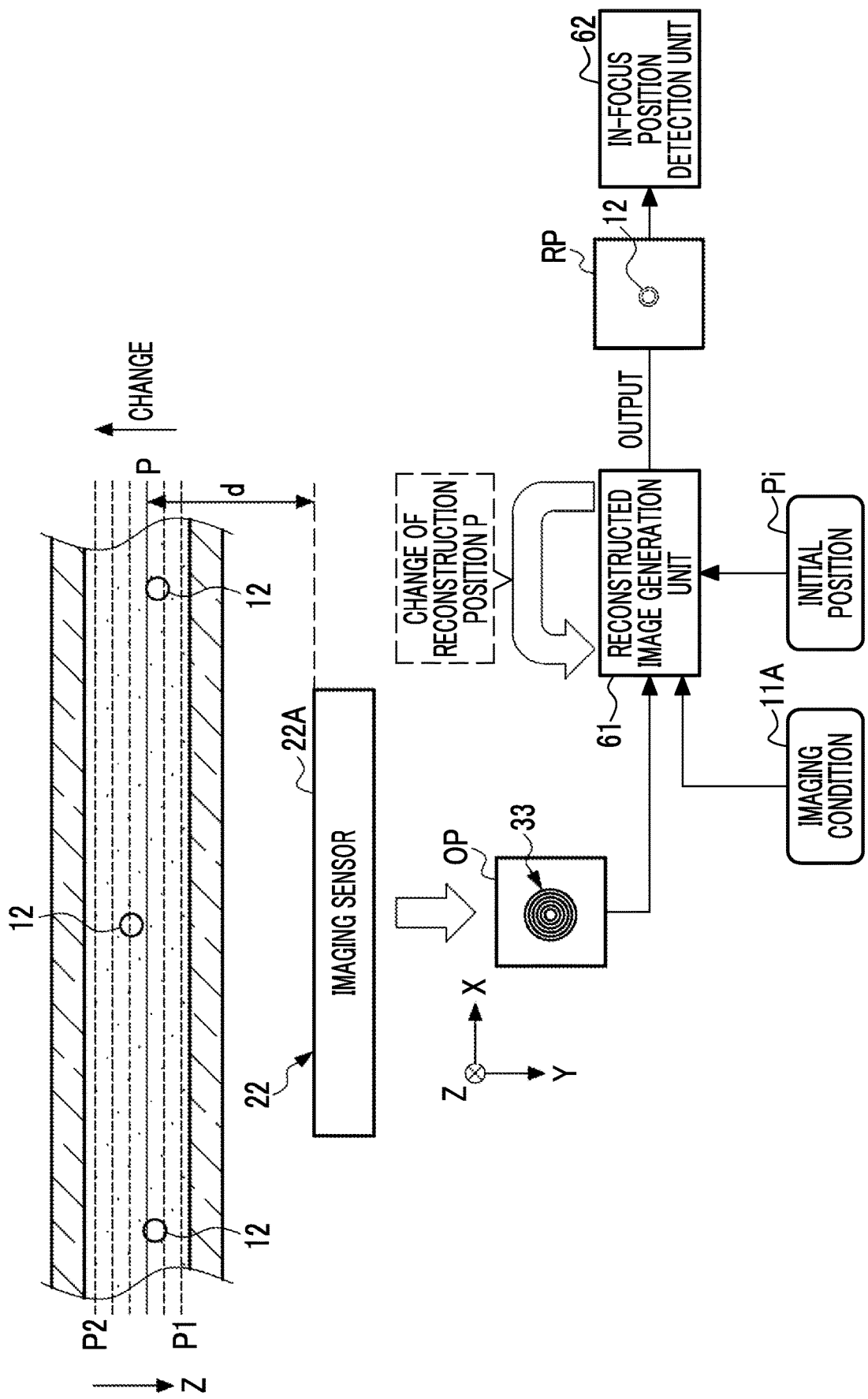
FIG. 11 is a diagram for describing reconstruction processing by a reconstructed image generation unit.

The reconstructed image generation unit 61 reconstructs the original image OP while changing the reconstruction position to generate a reconstructed image RP at each reconstruction position. Specifically, as shown in FIG. 11, the reconstructed image generation unit 61 generates the reconstructed image RP each time a reconstruction position P is changed while changing the reconstruction position P by a constant value. The reconstruction position P is a position (so-called depth position) represented by a distance d from the imaging surface 22A of the imaging sensor 22 in a direction of the light source 20.

The reconstructed image generation unit 61 performs the reconstruction processing based on, for example, Fresnel conversion equations represented by the following equations (1) to (3).

$$\Gamma(m, n) = \frac{i}{\lambda d}\exp\left(-i\frac{2\pi}{\lambda}d\right)\exp\left[-i\pi\lambda d\left(\frac{m^2}{N_x^2 \Delta x^2} + \frac{m^2}{N_y^2 \Delta y^2}\right)\right] \times \quad (1)$$

$$\sum_{x=0}^{N_x-1}\sum_{y=0}^{N_y-1} I(x, y)\exp\left[-i\frac{\pi}{\lambda d}(x^2\Delta x^2 + y^2\Delta y^2)\right]\exp\left[i2\pi\left(\frac{xm}{N_x^2} + \frac{ym}{N_y^2}\right)\right]$$

$$A_0(m, n) = |\Gamma(m, n)|^2 \quad (2)$$

$$\varphi_0(m, n) = \arctan\frac{\mathrm{Im}[\Gamma(m, n)]}{\mathrm{Re}[\Gamma(m, n)]} \quad (3)$$

Here, I(x,y) represents the original image OP. X represents coordinates of the pixel 22B (refer to FIG. 3) of the imaging sensor 22 in the X direction. Y represents coordinates of the pixel 22B in the Y direction. $\Delta x$ is the first arrangement pitch, and $\Delta y$ is the second arrangement pitch (refer to FIG. 3). $\lambda$ is a wavelength of the irradiation light 23.

As shown in equation (1), $\Gamma(m,n)$ is a complex amplitude image obtained by performing the Fresnel conversion on the original image OP. Here, m=1, 2, 3, . . . , and Nx−1, and n=1, 2, 3, . . . , and Ny−1. Nx represents the number of arrangements of the pixels 22B in the X direction on the imaging surface 22A. Ny represents the number of arrangements of the pixels 22B in the Y direction on the imaging surface 22A.

As shown in equation (2), $A_0(m,n)$ is an intensity distribution image representing an intensity component of the complex amplitude image $\Gamma(m,n)$. As shown in equation (3), $\varphi_0(m,n)$ is a phase distribution image representing a phase component of the complex amplitude image $\Gamma(m,n)$.

The reconstructed image generation unit 61 obtains the complex amplitude image $\Gamma(m,n)$ by applying the original image OP to equation (1) and obtains the intensity distribution image $A_0(m,n)$ or the phase distribution image $\varphi_0(m,n)$ by applying the obtained complex amplitude image $\Gamma(m,n)$ to equation (2) or equation (3). The reconstructed image generation unit 61 obtains any one of the intensity distribution image $A_0(m,n)$ or the phase distribution image $\varphi_0(m,n)$, outputs the obtained image as the reconstructed image RP and stores the obtained image in the storage device 41.

In the present embodiment, the reconstructed image generation unit 61 outputs the phase distribution image $\varphi_0(m,n)$ as the reconstructed image RP. The phase distribution image $\varphi_0(m,n)$ is an image representing a refractive index distribution of the object to be observed. The cell 12 which is the object to be observed in the present embodiment is translucent, and thus most of the irradiation light 23 is not absorbed by the cell 12, but is transmitted or diffracted. Therefore, an image hardly appears in an intensity distribution. Therefore, in the present embodiment, it is preferable to use the phase distribution image $\varphi_0(m,n)$ as the reconstructed image RP.

The wavelength λ, of the irradiation light 23 is included in, for example, an imaging condition 11A supplied from the imaging device 11. The reconstructed image generation unit 61 performs the calculation of equation (1) using a value of the wavelength λ, included in the imaging condition 11A. Further, the reconstructed image generation unit 61 obtains the complex amplitude image $\Gamma(m,n)$ by performing the calculation of equation (1) while changing the distance d corresponding to the reconstruction position P by a constant value, and applies the obtained complex amplitude image $\Gamma(m,n)$ to equation (2) or equation (3).

Figure 12:
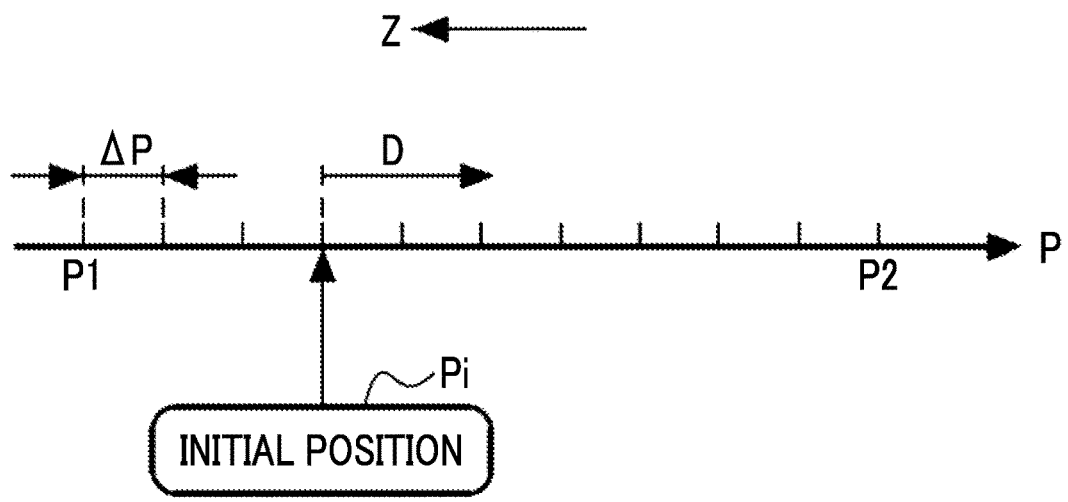
FIG. 12 is a diagram for describing processing of changing a reconstruction position.

Further, the reconstructed image generation unit 61 starts the change of the reconstruction position P from an initial position Pi supplied from the initial position deciding unit 64 described below. For example, as shown in FIG. 12, the reconstructed image generation unit 61 repeats the generation of the reconstructed image RP while changing the reconstruction position P by a constant value ΔP from the initial position Pi in a direction indicated by an arrow D (hereinafter referred to as change direction D). P1 and P2 shown in FIG. 12 respectively correspond, in the Z direction, to a lower limit and an upper limit of a range in which the cell 12, which is the object to be observed, may be present. The reconstructed image generation unit 61 changes the reconstruction position P within the range from the lower limit position P1 to the upper limit position P2. The change of the reconstruction position P corresponds to the change of the distance d in equation (1).

Figure 13:
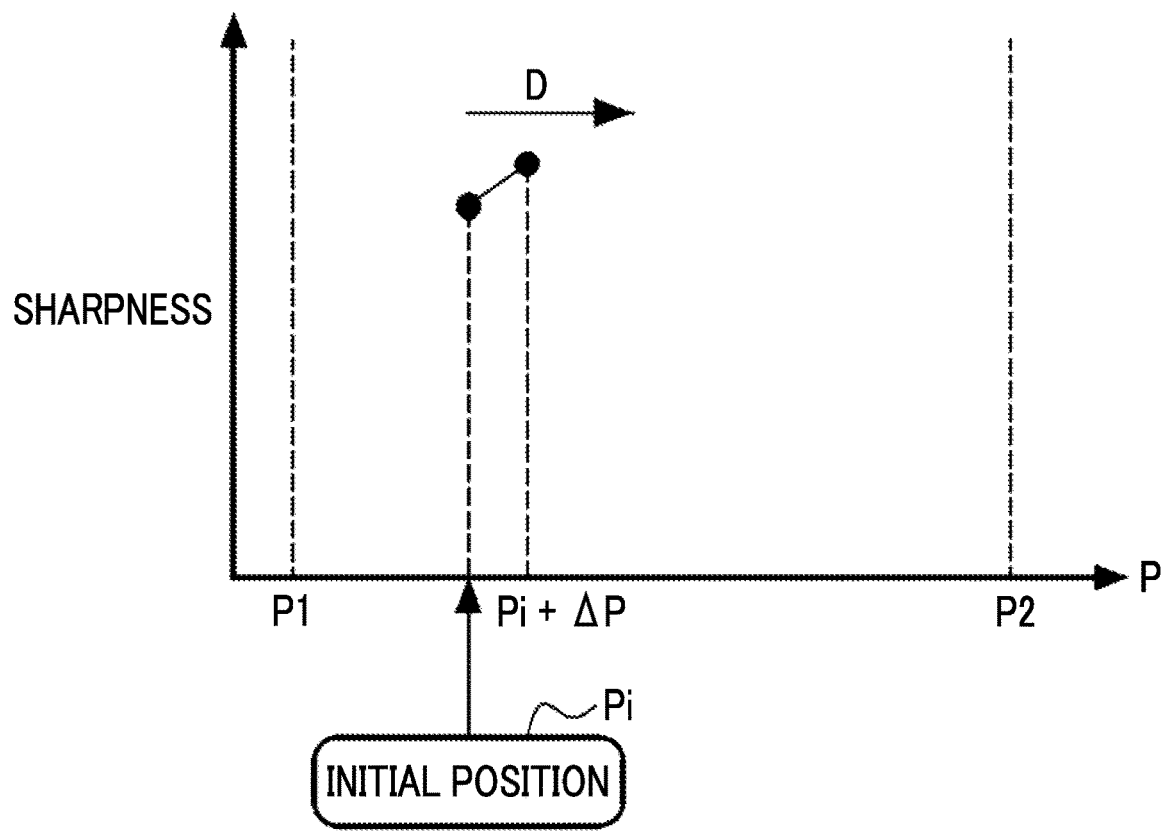
FIG. 13 is a diagram for describing processing of deciding a change direction of the reconstruction position.

The reconstructed image generation unit 61 decides the change direction D of the reconstruction position P from the initial position Pi based on sharpness of the reconstructed image RP calculated by the in-focus position detection unit 62 described below. For example, the reconstructed image generation unit 61 sets a direction in which the sharpness increases from the initial position Pi as the change direction D. For example, as shown in FIG. 13, the reconstructed image generation unit 61 acquires, from the in-focus position detection unit 62, the sharpness at a position (Pi+ΔP) shifted from the initial position Pi in a direction of the upper limit position P2 by the constant value ΔP. In a case where the sharpness of the position (Pi+ΔP) is higher than the sharpness of the initial position Pi, the reconstructed image generation unit 61 sets the direction from the initial position Pi toward the upper limit position P2 as the change direction D. On the contrary, in a case where the sharpness of the position (Pi+ΔP) is lower than the sharpness of the initial position Pi, the reconstructed image generation unit 61 sets a direction from the initial position Pi toward the lower limit position P1 as the change direction D.

In the reconstructed image generation unit 61, the reconstruction processing method is not limited to the method using the Fresnel conversion equation and the reconstruction processing may be performed by a Fourier iterative phase recovery method or the like.

Returning to FIG. 9, the in-focus position detection unit 62 obtains the sharpness of each reconstructed images RP that is output from the reconstructed image generation unit 61 and stored in the storage device 41, and searches for the reconstruction position P (hereinafter in-focus position Pm) where the sharpness is maximized. The in-focus position detection unit 62 detects the in-focus position Pm and inputs the in-focus position Pm to the in-focus position recording unit 63 every one imaging cycle.

The in-focus position detection unit 62 calculates, for example, a contrast value of the reconstructed image RP as the sharpness. The in-focus position detection unit 62 may use a value obtained by evaluating the spread of the image of the cell 12 in the reconstructed image RP with a cross-sectional profile or the like as the sharpness. Further, the in-focus position detection unit 62 may perform frequency analysis such as Fourier analysis to obtain the sharpness.

The in-focus position recording unit 63 performs in-focus position recording processing of sequentially recording the in-focus position Pm input from the in-focus position detection unit 62 every one imaging cycle in the storage device 41.

Each time the in-focus position recording unit 63 records the in-focus position Pm every one imaging cycle, the initial position deciding unit 64 decides the initial position Pi to be used for the reconstruction processing in the next imaging cycle by the reconstructed image generation unit 61 based on past one or more in-focus positions Pm recorded in the storage device 41. The initial position deciding unit 64 decides the initial position Pi based on, for example, a statistical amount (for example, most frequent value, median value, or average value) of a plurality of in-focus positions Pm. The initial position deciding unit 64 inputs the decided initial position Pi to the reconstructed image generation unit 61.

Each time the in-focus position recording unit 63 records the in-focus position Pm every one imaging cycle, the optimal reconstructed image output unit 65 acquires the reconstructed image RP corresponding to the in-focus position Pm from the storage device 41. Further, the optimal reconstructed image output unit 65 performs optimal reconstructed image output processing of outputting the acquired reconstructed image RP to the display control unit 53 as the optimal reconstructed image.

Figure 14:
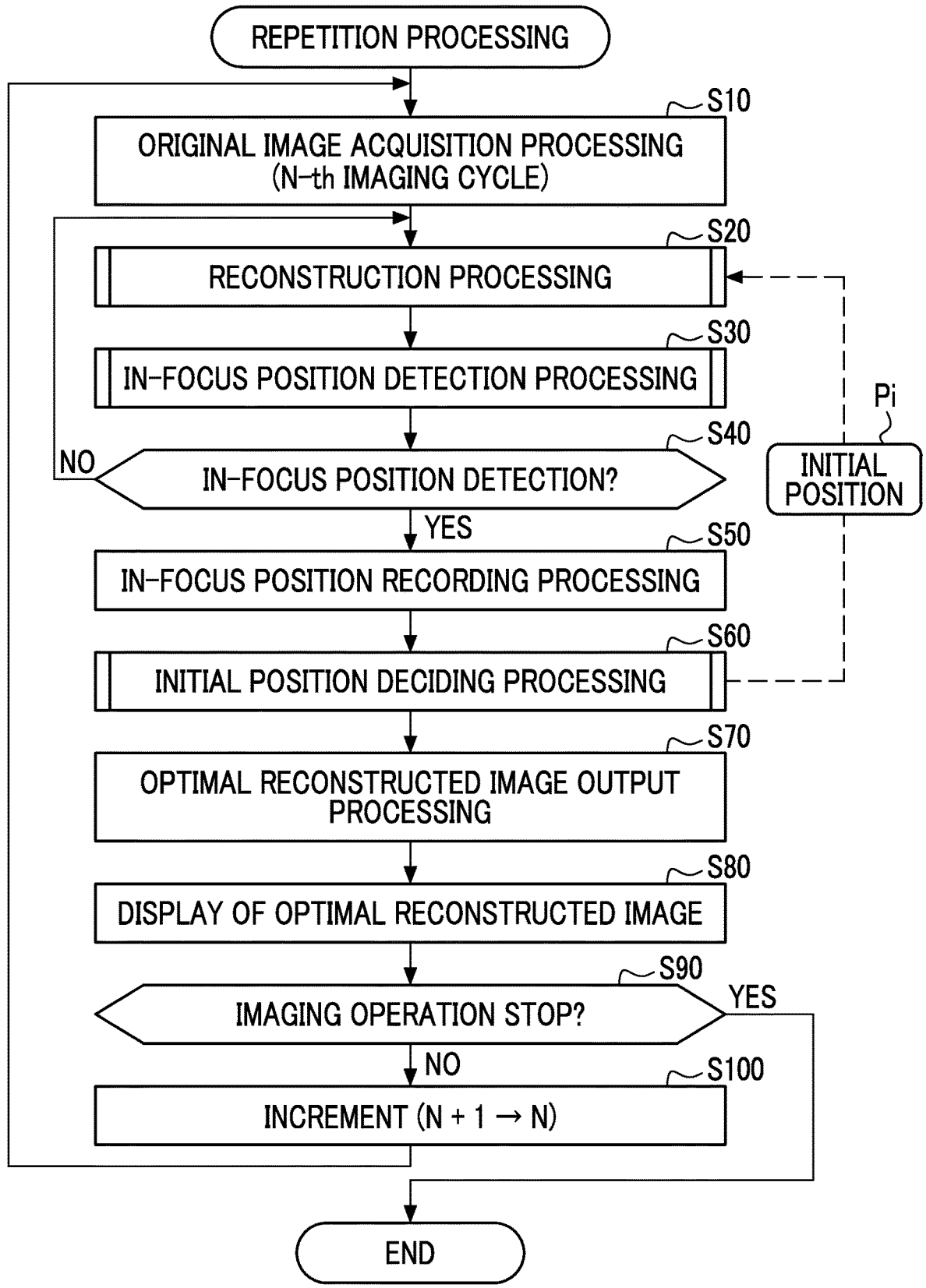
FIG. 14 is a flowchart showing an example of a flow of repetition processing.

FIG. 14 shows an example of a flow of repetition processing by the repetition control unit 52. In a case where the imaging operation (refer to FIG. 10) by the imaging device 11 is started, the original image acquisition unit 60 acquires the original image OP corresponding to a first imaging cycle (step S10). The original image OP acquired by the original image acquisition unit 60 is stored in the storage device 41.

Next, the reconstructed image generation unit 61 reads the original image OP from the storage device 41, sets the reconstruction position P to the initial position Pi, and then performs the above reconstruction processing to generate the reconstructed image RP (step S20). The reconstructed image RP generated by the reconstructed image generation unit 61 is stored in the storage device 41.

Next, the in-focus position detection unit 62 reads the reconstructed image RP from the storage device 41, calculates the sharpness of the reconstructed image RP, and detects the in-focus position Pm based on the calculated sharpness (step S30). Since the in-focus position Pm is the reconstruction position P where the sharpness is maximized, it is necessary to calculate the sharpness for at least three reconstructed images RP for the detection of the in-focus position Pm. For this purpose, step S30 needs to be repeated at least three times.

The repetition control unit 52 determines whether or not the in-focus position Pm is detected by the in-focus position detection unit 62 (step S40). In a case where determination is made that the in-focus position Pm is not detected (step S40: NO), the repetition control unit 52 returns the processing to step S20. Each of the pieces of processing of step S20 and step S30 is repeatedly executed until the determination is affirmed in step S40.

In a case where the in-focus position Pm is detected by the in-focus position detection unit 62 (step S40: YES), the repetition control unit 52 shifts the processing to step S50. In step S50, the in-focus position recording unit 63 records the in-focus position Pm detected by the in-focus position detection unit 62 in the storage device 41.

Next, the initial position deciding unit 64 decides the initial position Pi to be used in the reconstruction processing (step S20) in the next imaging cycle based on one or more in-focus positions Pm recorded in the storage device 41 in the past (step S60). The initial position Pi decided by the initial position deciding unit 64 is supplied to the reconstructed image generation unit 61.

The optimal reconstructed image output unit 65 acquires the reconstructed image RP corresponding to the in-focus position Pm recorded in the storage device 41 in the current imaging cycle from the storage device 41, and outputs the acquired reconstructed image RP to the display control unit 53 as the optimal reconstructed image (step S70). The display control unit 53 displays the optimal reconstructed image input from the optimal reconstructed image output unit 65 on the display 5 (step S80).

Next, the repetition control unit 52 determines whether or not the imaging stop signal is input from the input device 8 (step S90). In a case where determination is made that the imaging stop signal is not input (step S90: NO), the repetition control unit 52 increments a parameter N (refer to FIG. 10) representing an imaging cycle number (step S100) and returns the processing to step S10. In step S10, the original image acquisition unit 60 acquires the original image OP corresponding to a second imaging cycle. Each of the pieces of processing from step S10 to step S100 is repeatedly executed every one imaging cycle until the determination is affirmed in step S90.

In a case where determination is made that the imaging stop signal is input from the input device 8 (step S90: YES), the repetition control unit 52 ends the series of pieces of repetition processing.

Hereinafter, the reconstruction processing (step S20), the in-focus position detection processing (step S30), and the initial position deciding processing (step S60) will be described in detail.

Figure 15:
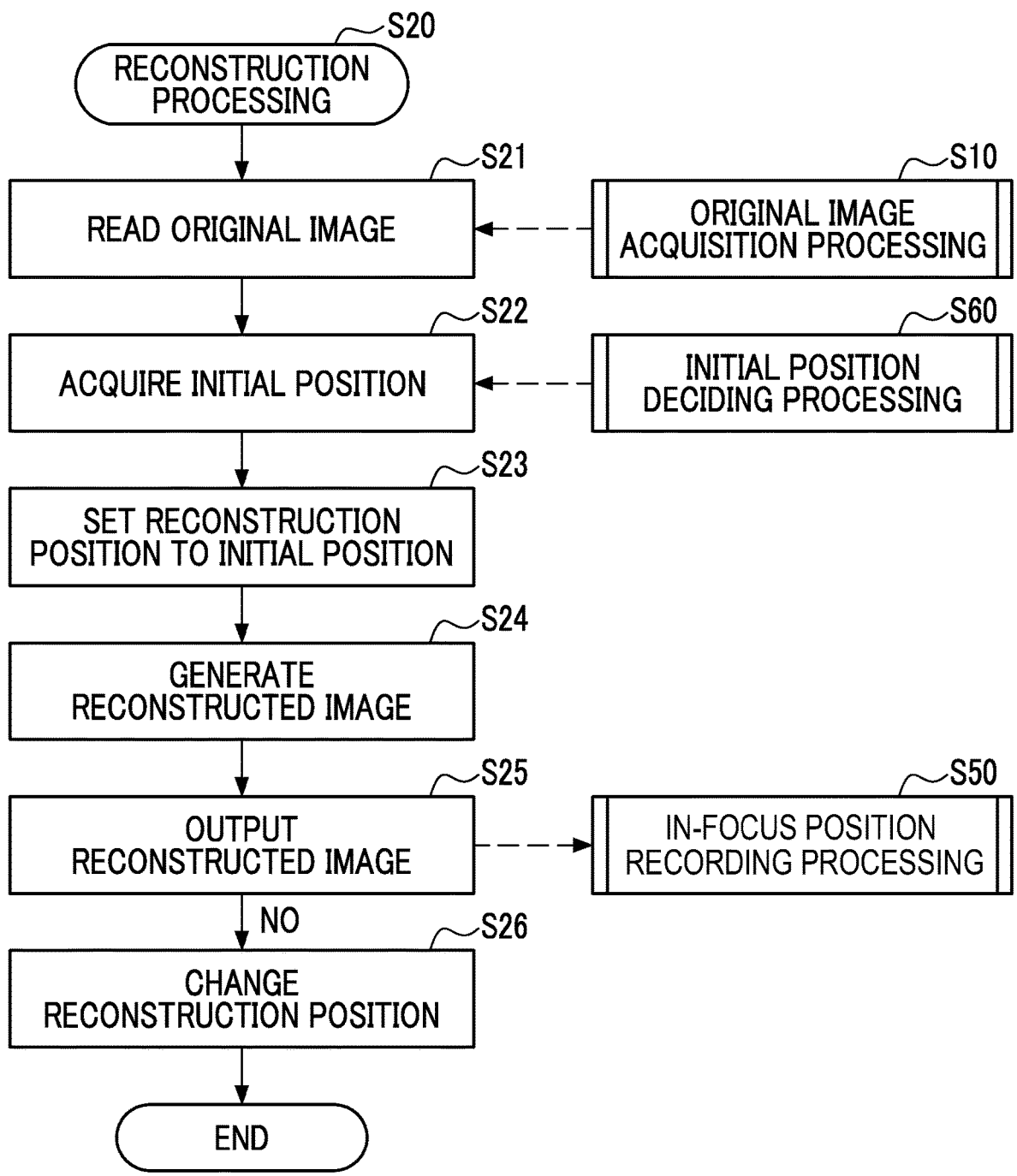
FIG. 15 is a flowchart showing an example of a flow of reconstruction processing.

FIG. 15 shows an example of a flow of the reconstruction processing by the reconstructed image generation unit 61. First, the reconstructed image generation unit 61 reads the original image OP that is acquired by the original image acquisition processing by the original image acquisition unit 60 and stored in the storage device 41 (step S21). Next, the reconstructed image generation unit 61 acquires the initial position Pi decided by the initial position deciding unit 64 (step S22).

Next, the reconstructed image generation unit 61 sets the acquired initial position Pi as the reconstruction position P (step S23). Since it is necessary to end at least one piece of reconstruction processing to decide the initial position Pi by the initial position deciding unit 64, the initial position Pi cannot be obtained from the initial position deciding unit 64 in the first reconstruction processing. Therefore, in the first reconstruction processing, the reconstructed image generation unit 61 sets, for example, the initial position Pi at a center position located at the center between the lower limit position P1 and the upper limit position P2 (refer to FIG. 12). Further, the reconstructed image generation unit 61 may set the initial position Pi to the lower limit position P1 or the upper limit position P2 in the first reconstruction processing.

Next, the reconstructed image generation unit 61 performs the calculation based on the original image OP using equations (1) and (3) to generate the reconstructed image RP at the reconstruction position P as shown in FIG. 11 (step S24). In this case, the reconstructed image generation unit 61 performs the calculation using the value of the wavelength $\lambda$, included in the imaging condition 11A supplied from the imaging device 11. As described above, in the present embodiment, the reconstructed image RP is the phase distribution image $\varphi_O(m,n)$.

The reconstructed image generation unit 61 outputs the generated reconstructed image RP to store the output image in the storage device 41 (step S25). The reconstructed image RP stored in the storage device 41 is used in the in-focus position detection processing by the in-focus position detection unit 62.

Next, the reconstructed image generation unit 61 changes the reconstruction position P in the change direction D by the constant value $\Delta P$ (refer to FIG. 12) (step S26). In the first reconstruction processing, the reconstructed image generation unit 61 changes the reconstruction position P, for example, with the direction from the initial position Pi toward the upper limit position P2 as the change direction D. In the second reconstruction processing, the reconstructed image generation unit 61 compares the sharpness of the reconstructed image RP obtained in the first reconstruction processing with the sharpness of the reconstructed image RP obtained in the second reconstruction processing to change the reconstruction position P with the direction in which the sharpness increases as the change direction D (refer to FIG. 13). With the above, one piece of reconstruction processing ends.

Figure 16:
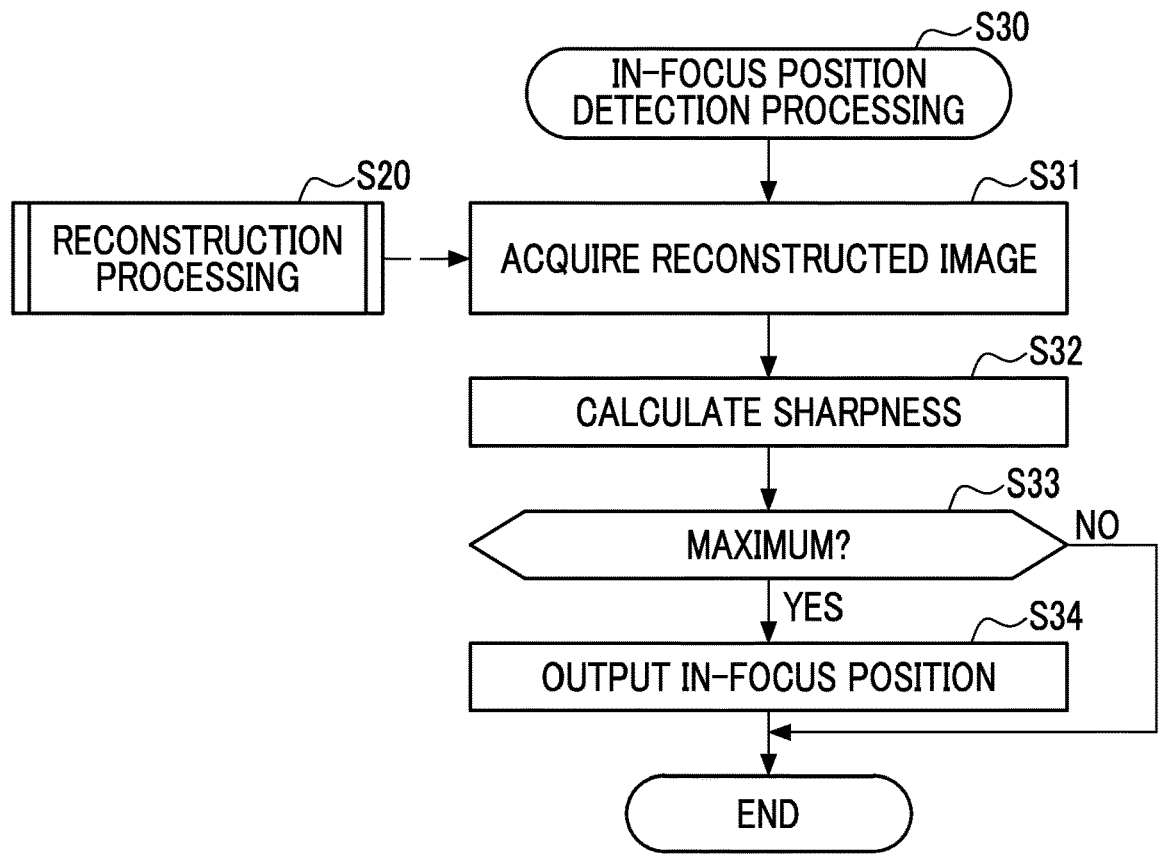
FIG. 16 is a flowchart showing an example of a flow of in-focus position detection processing.

FIG. 16 shows an example of a flow of the in-focus position detection processing by the in-focus position detection unit 62. First, the in-focus position detection unit 62 acquires one reconstructed image RP that is output from the reconstructed image generation unit 61 and stored in the storage device 41 (step S31). The in-focus position detection unit 62 calculates the sharpness of the acquired reconstructed image RP (step S32).

Next, the in-focus position detection unit 62 determines whether or not the calculated sharpness reaches the maximum (step S33). In a case where determination is made that the sharpness is not reached the maximum (step S33: NO), the in-focus position detection unit 62 ends the processing.

In a case where determination is made that the calculated sharpness is reached the maximum (YES in step S33), the in-focus position detection unit 62 detects the reconstruction position P where the sharpness is maximized as the in-focus position Pm and outputs the detected in-focus position Pm to the in-focus position recording unit 63 (step S34). With the above, one piece of in-focus position detection processing ends.

Figure 17:
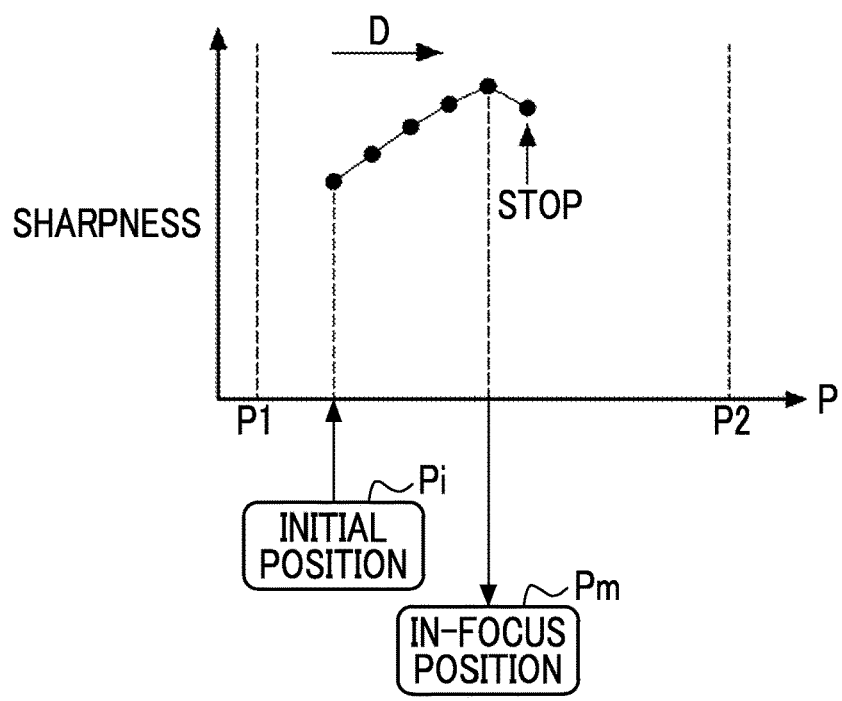
FIG. 17 is a diagram for describing processing of searching for an in-focus position.

FIG. 17 shows an example of processing of searching for the in-focus position Pm. As shown in FIG. 17, the in-focus position detection unit 62 performs, for example, peak determination of the sharpness by a so-called mountain climbing method. Each time the sharpness is calculated, the in-focus position detection unit 62 plots the calculated sharpness in association with the reconstruction position P. The sharpness increases as the reconstruction position P approaches an in-focus position Pm and decreases after the reconstruction position P passes the in-focus position Pm. In a case where detection is made that the sharpness has changed from the increase to the decrease, the in-focus position detection unit 62 detects a previous reconstruction position P as the in-focus position Pm. The in-focus position Pm corresponds to a depth position of the cell 12, which is the object to be observed.

Figure 18:
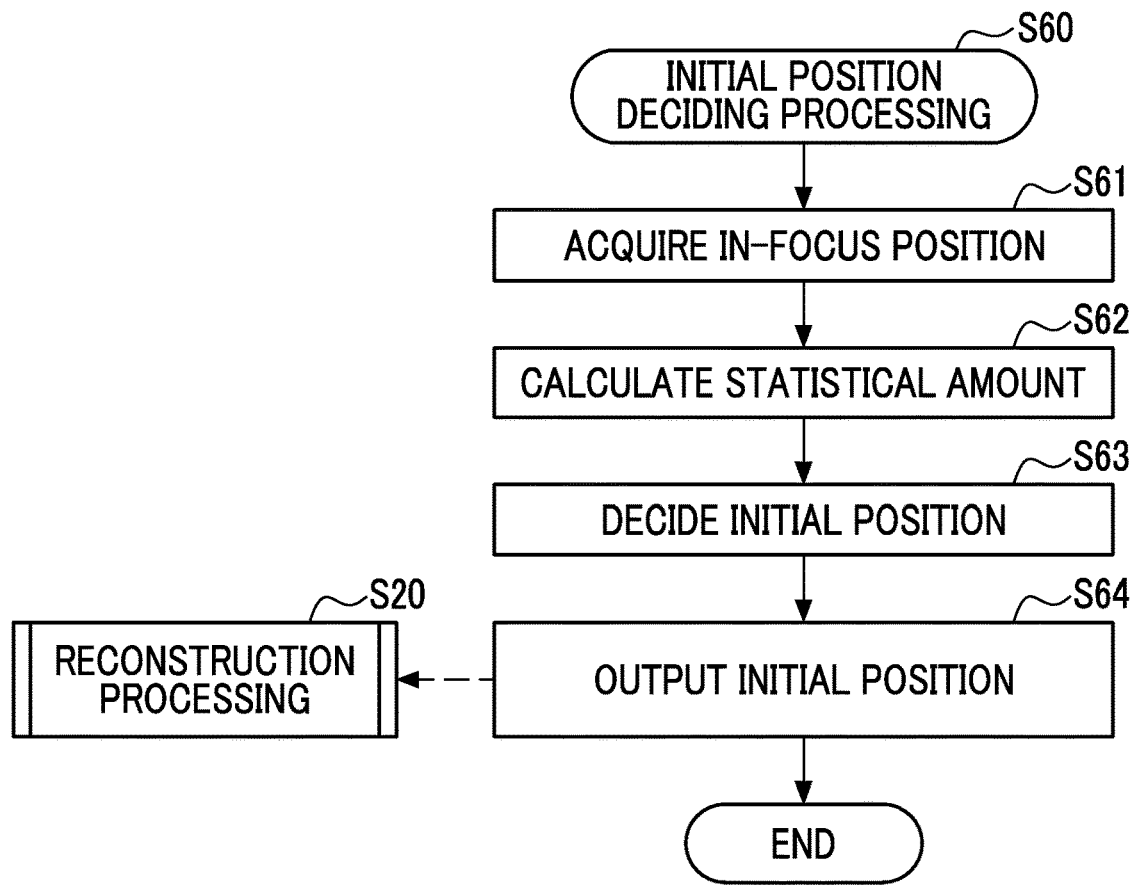
FIG. 18 is a flowchart showing an example of a flow of initial position deciding processing.

FIG. 18 shows an example of a flow of the initial position deciding processing by the initial position deciding unit 64. First, the initial position deciding unit 64 acquires one or more in-focus positions Pm recorded in the storage device 41 in the past by the in-focus position recording unit 63 (step S61). The initial position deciding unit 64 acquires, for example, one or more in-focus positions Pm recorded in the storage device 41 during a period between the start of the imaging operation by the imaging device 11 and the current imaging cycle.

Figure 19:
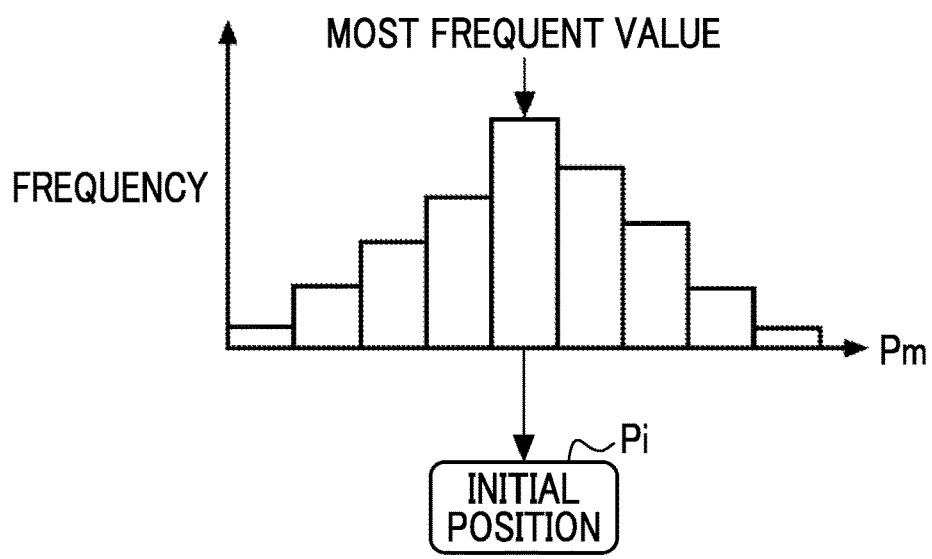
FIG. 19 is a diagram showing an example of the initial position deciding processing.

Next, the initial position deciding unit 64 calculates the statistical amount of the acquired one or more in-focus positions Pm (step S62). For example, as shown in FIG. 19, the initial position deciding unit 64 creates a histogram based on the acquired one or more in-focus positions Pm to calculate the most frequent value of the in-focus position Pm. The initial position deciding unit 64 is not limited to the most frequent value and may calculate the median value, the average value, or the like.

The initial position deciding unit 64 decides the calculated statistical amount as the initial position Pi (step S63) and outputs the decided initial position Pi to the reconstructed image generation unit 61 (step S64). With the above, one piece of initial position deciding processing ends.

The initial position deciding unit 64 may decide the in-focus position Pm obtained in an immediately preceding imaging cycle by the in-focus position detection unit 62 as the initial position Pi without calculating the statistical amount of the in-focus position Pm.

As described above, according to the technique of the present disclosure, since the initial position Pi of the reconstruction position P for starting the reconstruction processing is decided based on the in-focus position Pm in the past, the search for the in-focus position Pm can be speeded up.

The position of the cell 12 flowing through the microchannel 13 in the depth direction is not constant and a variation therein occurs. However, with the deciding of the initial position Pi based on the in-focus position Pm in the past, the number of pieces of the reconstruction processing and the in-focus position detection processing is reduced. Accordingly, the search for the in-focus position Pm is speeded up. With the speed-up of the search for the in-focus position Pm, it is possible to display the optimal reconstructed image in which the cell 12 as the object to be observed is clearly shown on the display 5 in real time.

Second Embodiment

Figure 20:
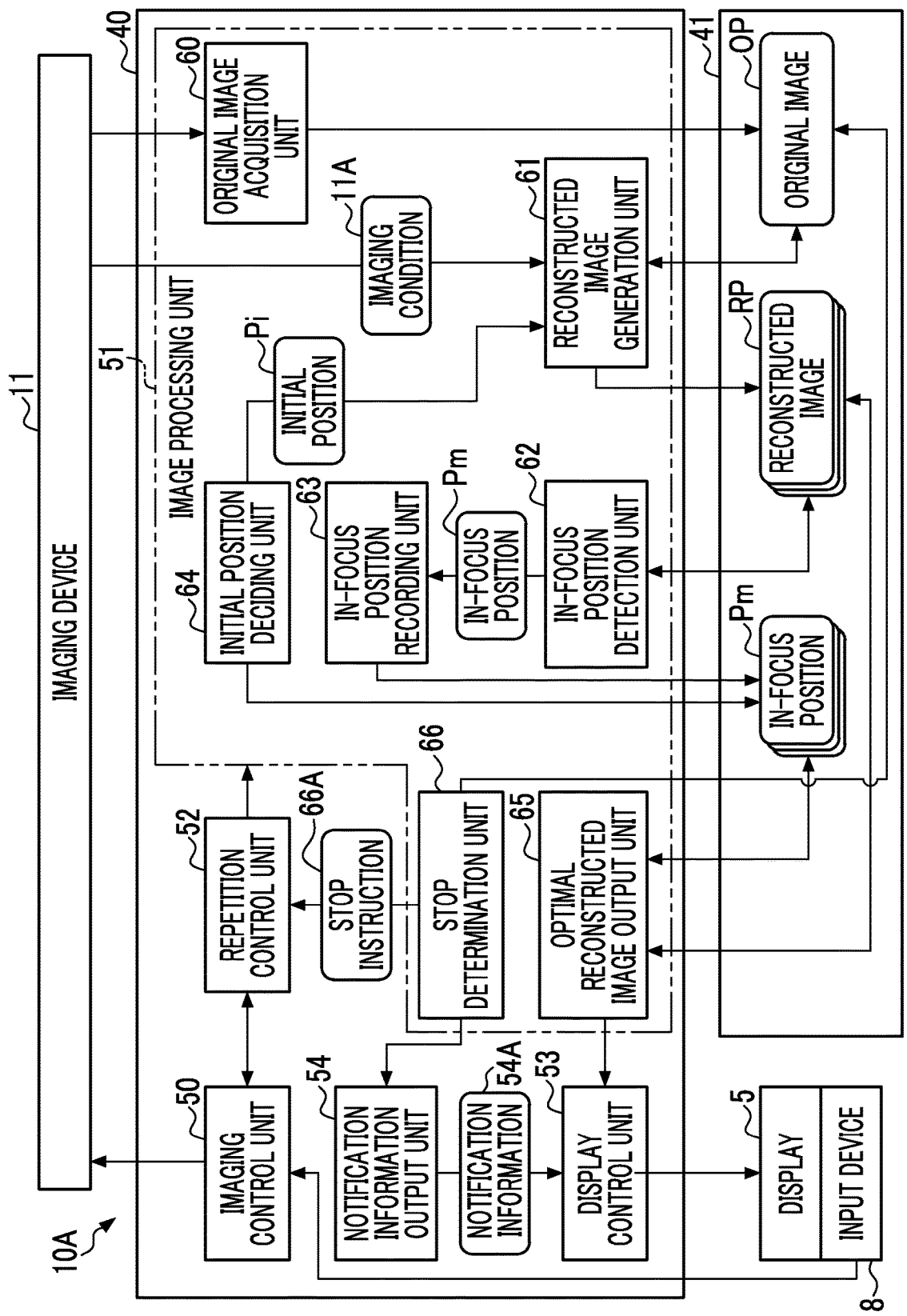
FIG. 20 is a block diagram showing a functional configuration of an information processing device according to a second embodiment.

Next, a second embodiment of the technique of the present disclosure will be described. FIG. 20 shows a functional configuration of an information processing device 10A according to the second embodiment. The information processing device 10A according to the second embodiment is configured of a stop determination unit 66 and a notification information output unit 54 in addition to the functional configuration of the information processing device 10 according to the first embodiment. The stop determination unit 66 is included in the image processing unit 51.

In the present embodiment, in a case where a stop instruction 66A to be input from the stop determination unit 66 is input, the repetition control unit 52 performs stop processing of stopping the repetition processing of the image processing unit 51. Further, in a case where the input of the stop instruction 66A is released, the repetition control unit 52 restarts the repetition processing of the image processing unit 51.

The stop determination unit 66 calculates a difference amount between two original images OP having different imaging cycles and outputs the stop instruction 66A to the repetition control unit 52 in a case where the calculated difference amount is equal to or less than a certain value. The fact that the difference amount between the two original images OP is equal to or less than the certain value corresponds to a fact that the cell 12 as the object to be observed is not shown in the original image OP. That is, the stop determination unit 66 also functions as an object detector. In a case where the flow of the solution 14 in the microchannel 13 is stopped, the change in the original image OP obtained in each imaging cycle is reduced, and the difference amount is equal to or less than the certain value. In this manner, the stop determination unit 66 also functions as a flow detector that detects the flow of the solution 14 in the microchannel 13.

In a case where the difference amount calculated by the stop determination unit 66 is equal to or less than the certain value, the notification information output unit 54 performs notification information output processing of outputting notification information 54A to the display control unit 53. The display control unit 53 displays the notification information 54A input from the notification information output unit 54 on the display 5. The notification information 54A is, for example, information for notifying the user that the cell 12 is not detected. The notification information 54A may be information for notifying the user that the flow of the solution 14 is stopped.

The notification information output unit 54 may output the notification information 54A to a speaker (not shown) to notify the user of the presence or absence of detection of the cell 12 or the like by voice.

Figure 21:
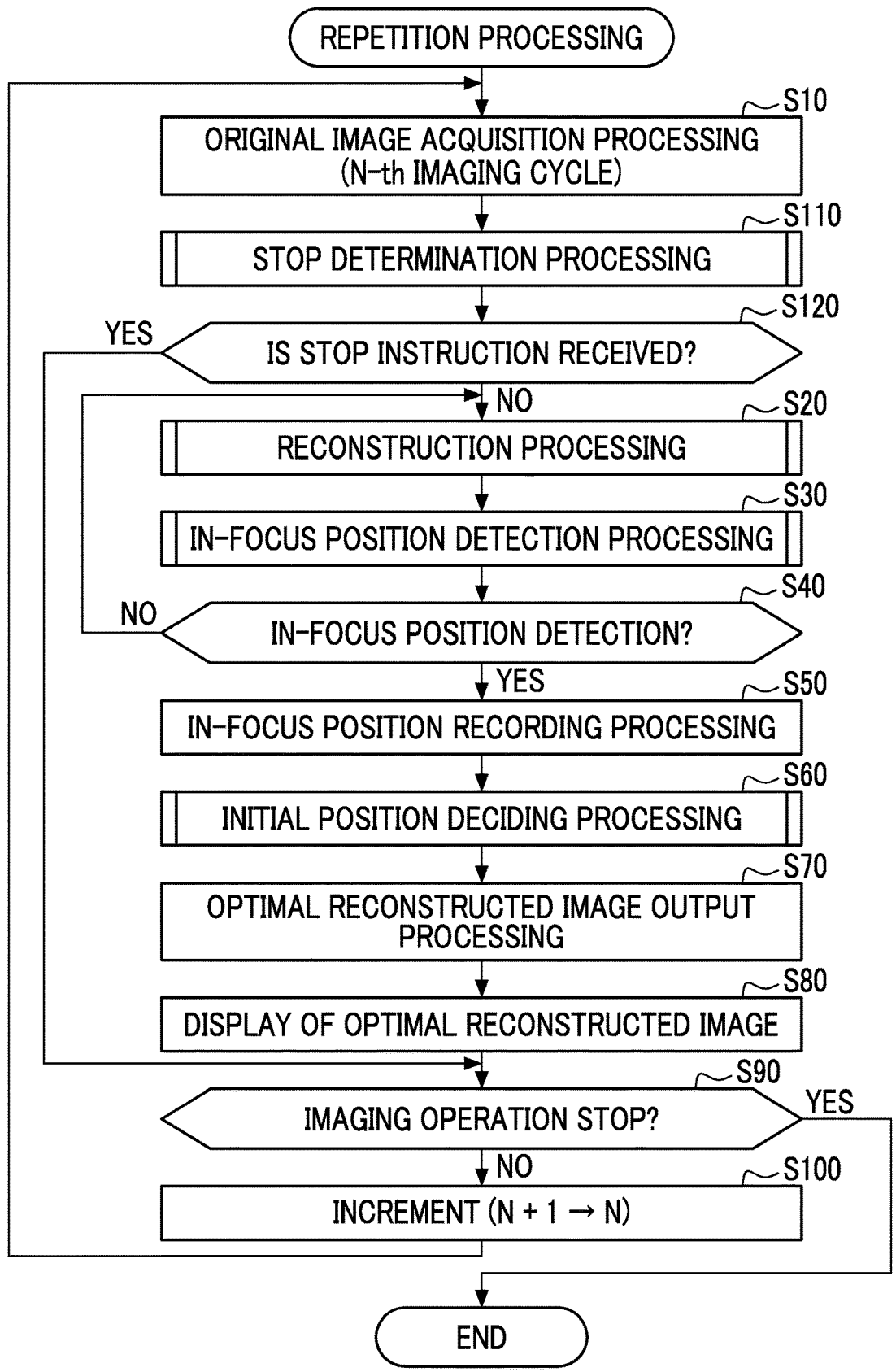
FIG. 21 is a flowchart showing a flow of repetition processing according to the second embodiment.

FIG. 21 shows a flow of the repetition processing by the repetition control unit 52 according to the second embodiment. The repetition processing of the present embodiment is different from the repetition processing of the first embodiment shown in FIG. 14 only in that step S110 and step S120 are added between step S10 and step S20.

In the present embodiment, the original image OP is acquired by the original image acquisition unit 60 and stored in the storage device 41 in step S10, and then the above determination processing is performed by the stop determination unit 66 (step S110). In a case where the above stop condition is satisfied, the stop determination unit 66 outputs the stop instruction 66A.

Next, the repetition control unit 52 determines whether or not the stop instruction 66A is received from the stop determination unit 66 (step S120). In a case where determination is made that the stop instruction 66A is not received (step S120: NO), the repetition control unit 52 shifts the processing to step S20. The processing after step S20 is the same as that of the first embodiment.

On the other hand, in a case where determination is made that the stop instruction 66A is received (step S120: YES), the repetition control unit 52 shifts the processing to step S90. The processing after step S90 is the same as that of the first embodiment.

As described above, in the repetition processing of the present embodiment, in a case where the stop instruction 66A is output from the stop determination unit 66, the pieces of processing such as the reconstruction processing and the in-focus position detection processing included in steps S20 to S30 are skipped. That is, the pieces of processing such as the reconstruction processing and the in-focus position detection processing are executed only in a case where the cell 12 is detected.

Figure 22:
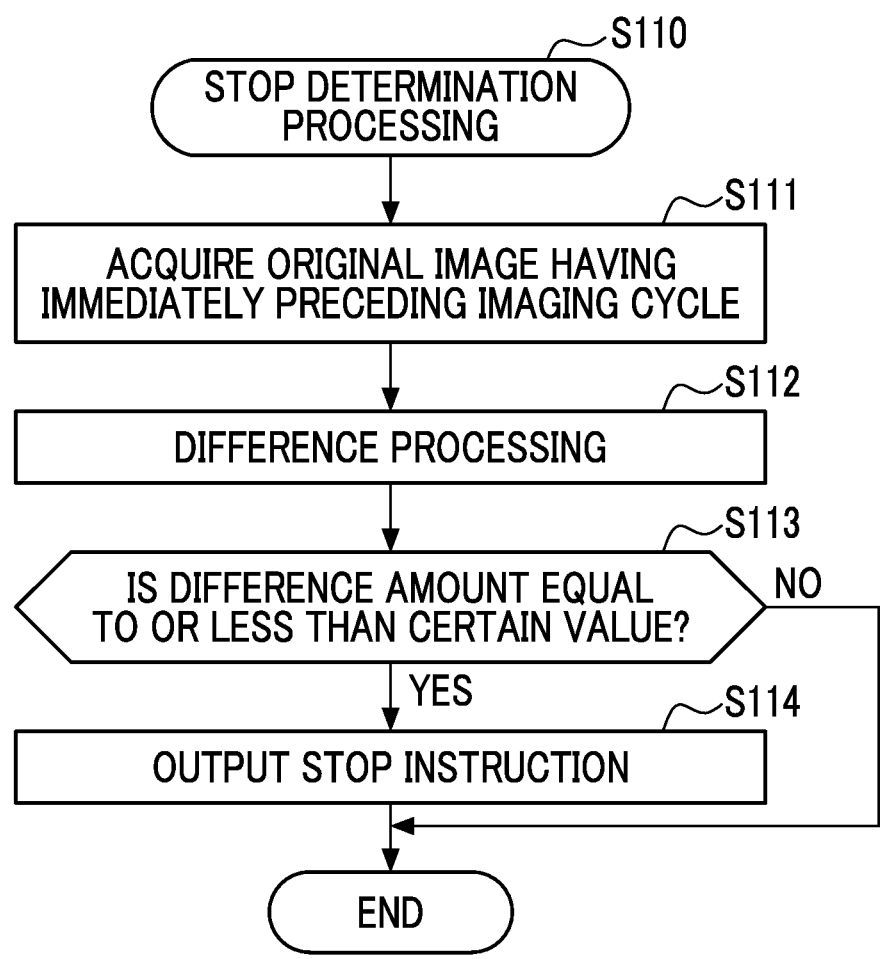
FIG. 22 is a flowchart showing an example of stop determination processing.

FIG. 22 shows an example of stop determination processing by the stop determination unit 66. First, the stop determination unit 66 acquires two original images OP obtained in two most recent imaging cycles from the storage device 41 (step S111). Next, the stop determination unit 66 performs difference processing of subtracting the other from one of the two acquired original images OP to calculate the difference amount (step S112).

The stop determination unit 66 determines whether or not the calculated difference amount is equal to or less than the certain value (step S113). In a case where the difference amount is not equal to or less than the certain value (step S113: NO), the stop determination unit 66 ends the processing. In a case where the difference amount is equal to or less than the certain value (step S113: YES), the stop determination unit 66 outputs the stop instruction 66A (step S114) and ends the processing.

As described above, according to the second embodiment, since the pieces of processing such as the reconstruction processing and the in-focus position detection processing are executed only in a case where the cell 12 is detected, it is possible to reduce a calculation load of the CPU 40 and an amount of data to be stored in the storage device 41. Further, in the second embodiment, since the notification information 54A is notified in a case where the cell 12 is not detected, the user can easily grasp that the cell 12 is not detected.

In the second embodiment, the stop determination unit 66 calculates the difference amount between the two original images OP having different imaging cycles, but the present invention is not limited thereto. The stop determination unit 66 may calculate the difference amount between two reconstructed images RP having different imaging cycles. Further, the stop determination unit 66 may calculate the difference amount between two optimal reconstructed images having different imaging cycles.

In the second embodiment, the stop determination unit 66 outputs the stop instruction 66A in a case where the determination is made that the difference amount is equal to or less than the certain value. However, the stop determination unit 66 may output the stop instruction 66A in a case where the imaging cycle in which the difference amount is equal to or less than the certain value is repeated a certain number of times.

In the second embodiment, the notification information output unit 54 outputs that the cell 12 is not detected as the notification information 54A. However, conversely, the notification information output unit 54 may output that the cell 12 is detected as the notification information 54A.

In the second embodiment, the stop determination unit 66 calculates the difference amount between the two images to detect the presence or absence of the cell 12. However, the stop determination unit 66 may perform image recognition processing using a method such as image analysis or machine learning to detect the presence or absence of the cell 12. In this case, the notification information output unit 54 may output an image of the cell 12, the number of cells 12, a speed of the cell 12 flowing through the microchannel 13, and the like as the notification information 54A.

The object to be observed is not limited to the cell, and may be a dead cell or an object such as dust. The notification information output unit 54 may determine a type of the object to be observed from a shape or the like of the object to be observed detected by image analysis or image recognition, and output the type of the object to be observed as the notification information 54A.

In the second embodiment, although the imaging device 11 images one microchannel 13, a plurality of microchannels 13 may be imaged at the same time. In this case, it is preferable that the pieces of processing such as the reconstruction processing and the in-focus position detection processing are executed only on the microchannel 13 in which the cell 12 is detected.

Modification Example

Hereinafter, various modification examples will be described. In each of the above embodiments, the phase distribution image $\varphi_0(m,n)$ obtained by equation (3) is used as the reconstructed image RP, but the reconstructed image RP is not limited thereto. The intensity distribution image $A_0(m,n)$ obtained by equation (2) may be used as the reconstructed image RP. In a case where the object to be observed has a thickness such as a cell population (so-called colony), an image appears in the intensity distribution. Therefore, it is preferable to use the intensity distribution image $A_0(m,n)$ as the reconstructed image RP.

The user may select which of the phase distribution image $\varphi_0(m,n)$ and the intensity distribution image $A_0(m,n)$ is used as the reconstructed image RP, by using the input device 8. Accordingly, the user can select an optimal reconstructed image RP according to the object to be observed.

The digital holography system 2 according to each of the above embodiments relates to a technique referred to as so-called lens-free imaging in which the imaging device 11 does not comprise an optical lens. The technique of the present disclosure is not limited to the lens-free imaging and can be applied to general digital holography (for example, in a case where reference light is used).

The hardware configuration of the computer configuring the information processing devices 10 and 10A may be modified in various ways. For example, the information processing device 10 may be configured of a plurality of computers separated as hardware for the purpose of improving processing capacity and reliability.

As described above, the hardware configuration of the computer of the information processing devices 10 and 10A may be changed as appropriate according to required performance such as processing capacity, safety, and reliability. Further, not only the hardware but also the application program such as the operation programs 41A may be duplicated or stored in a plurality of storage devices in a distributed manner for the purpose of ensuring safety and reliability.

In each of the above embodiments, for example, as a hardware structure of the processing units executing various types of processing such as the imaging control unit 50, the image processing unit 51, the repetition control unit 52, the display control unit 53, and the notification information output unit 54, various processors shown below can be used. The various processors include a programmable logic device (PLD) which is a processor whose circuit configuration is changeable after manufacturing such as a field programmable gate array (FPGA), a dedicated electric circuit which is a processor having a circuit configuration exclusively designed to execute specific processing such as an application specific integrated circuit (ASIC), and the like, in addition to the CPU 40 which is a general-purpose processor that executes software (operation program 41A) to function as various processing units, as described above.

One processing unit may be configured by one of the various processors or a combination of two or more processors of the same type or different types (for example, a combination of a plurality of FPGAs and/or a combination of a CPU and an FPGA). The plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system on chip (SoC) or the like. As described above, the various processing units are configured using one or more of the various processors as the hardware structure.

Further, more specifically, a circuitry combining circuit elements such as semiconductor elements can be used as the hardware structure of the various processors.

The above embodiment and each modification example can be combined as appropriate as long as there is no contradiction.

In a case where all of documents, patent applications, and technical standard described in the specification are incorporated in the specification as references, to the same degree as a case where the incorporation of each of documents, patent applications, and technical standard as references is specifically and individually noted.

What is claimed is:

1. An information processing device that reconstructs an original image including an interference fringe image of an object to be observed, the information processing device comprising:
   at least one processor,
   wherein the processor is configured to:
   acquire the original image;
   generate a reconstructed image while changing a reconstruction position from an initial position that is decided dynamically for each reconstruction process based on the acquired original image;
   calculate sharpness of the reconstructed image each time the reconstructed image is generated and detect dynamically an in-focus position where the calculated sharpness is maximized;
   record the detected in-focus position;
   decide dynamically an initial position of a next reconstruction based on the recorded in-focus position; and
   repeat the acquisition of the original image, the reconstruction, the detection of the in-focus position, the recording of the in-focus position, and the deciding of the initial position as one imaging cycle.

2. The information processing device according to claim 1,
   wherein the processor is configured to:
   decide the in-focus position obtained in an immediately preceding imaging cycle as the initial position among one or more in-focus positions recorded in the past.

3. The information processing device according to claim 1,
   wherein the processor is configured to:
   calculate a statistical value from one or more in-focus positions recorded in the past and decide the calculated statistical value as the initial position.

4. The information processing device according to claim 3,
   wherein the statistical value is one of a most frequent value, a median value, or an average value.

5. The information processing device according to claim 1,
   wherein the processor is configured to:
   change the reconstruction position from the initial position in a direction in which the sharpness increases.

6. The information processing device according to claim 1,
   wherein the processor is configured to:
   calculate a difference amount between two original images or two reconstructed images having different imaging cycles; and
   in a case where the calculated difference amount is equal to or less than a certain value, stop the repetition.

7. The information processing device according to claim 6,
   wherein the processor is configured to:
   in a case where the difference amount is equal to or less than a certain value, output notification information.

8. The information processing device according to claim 1,
   wherein the processor is configured to:
   output the reconstructed image at the detected in-focus position as an optimal reconstructed image.

9. A method of operating an information processing device that reconstructs an original image including an interference fringe image of an object to be observed, the method executes:
   original image acquisition processing of acquiring the original image;
   reconstruction processing of generating a reconstructed image while changing a reconstruction position from an initial position that is decided dynamically for each reconstruction process based on the original image acquired by the original image acquisition processing;
   in-focus position detection processing of calculating sharpness of the reconstructed image each time the reconstructed image is generated by the reconstruction processing and detecting dynamically an in-focus position where the calculated sharpness is maximized;
   in-focus position recording processing of recording the in-focus position detected by the in-focus position detection processing;
   initial position deciding processing of deciding dynamically the initial position in a next reconstruction processing based on the in-focus position recorded by the in-focus position recording processing; and
   repetition processing of executing the original image acquisition processing, the reconstruction processing, the in-focus position detection processing, the in-focus position recording processing, and the initial position deciding processing every one imaging cycle.

10. A non-transitory computer-readable storage medium storing an operation program causing a computer to execute processing of reconstructing an original image including an interference fringe image of an object to be observed, the operation program causing the computer to execute:

original image acquisition processing of acquiring the original image;

reconstruction processing of generating a reconstructed image while changing a reconstruction position from an initial position that is decided dynamically for each reconstruction process based on the original image acquired by the original image acquisition processing;

in-focus position detection processing of calculating sharpness of the reconstructed image each time the reconstructed image is generated by the reconstruction processing and detecting dynamically an in-focus position where the calculated sharpness is maximized;

in-focus position recording processing of recording the in-focus position detected by the in-focus position detection processing;

initial position deciding processing of deciding dynamically the initial position in a next reconstruction processing based on the in-focus position recorded by the in-focus position recording processing; and repetition processing of executing the original image acquisition processing, the reconstruction processing, the in-focus position detection processing, the in-focus position recording processing, and the initial position deciding processing every one imaging cycle.

* * * * *